United States Patent
Khan

(10) Patent No.: US 10,936,378 B1
(45) Date of Patent: Mar. 2, 2021

(54) SYSTEM AND METHOD FOR AUTOMATING INTEGRATION PROCESS BUILDING BETWEEN MULTIPLE APPLICATIONS USING INTEGRATION ASSISTANCE ROBOTS

(71) Applicant: Dell Products, LP, Round Rock, TX (US)

(72) Inventor: Thameem U. Khan, Germantown, MD (US)

(73) Assignee: BOOMI, INC., Round Rock, TX (US)

( * ) Notice: Subject to any disclaimer, the term of this patent is extended or adjusted under 35 U.S.C. 154(b) by 0 days.

(21) Appl. No.: 16/672,936

(22) Filed: Nov. 4, 2019

(51) Int. Cl.
*G06F 9/54* (2006.01)

(52) U.S. Cl.
CPC ...................................... *G06F 9/54* (2013.01)

(58) Field of Classification Search
None
See application file for complete search history.

(56) References Cited

U.S. PATENT DOCUMENTS 9,299,339 B1 * 3/2016 Uszkoreit ............. G06F 40/205
2009/0248189 A1 * 10/2009 Schmidt ................. G05B 17/02
700/109

\* cited by examiner

*Primary Examiner* — Craig C Dorais
(74) *Attorney, Agent, or Firm* — Prol Intellectual Property Law, PLLC; H. Kenneth Prol

(57) ABSTRACT

An information handling system operating an integration assistance robotic automation system may comprise a memory storing a log of machine-executable code instructions generated by a plurality of application programming interfaces (APIs) for a plurality of applications, based on user instructions previously received at the APIs to define an integration process between a first application executing code instructions in a first coding language and a second application executing code instructions in a second coding language, and a processor parsing the log to identify a first connector code set in the first language defining an action to be taken on a dataset managed by the first application, and a second connector code set in the second language defining an action to be taken on a dataset managed by the second application, and transmitting an executable run-time engine, the first and second connector code sets for execution at an execution location.

20 Claims, 11 Drawing Sheets

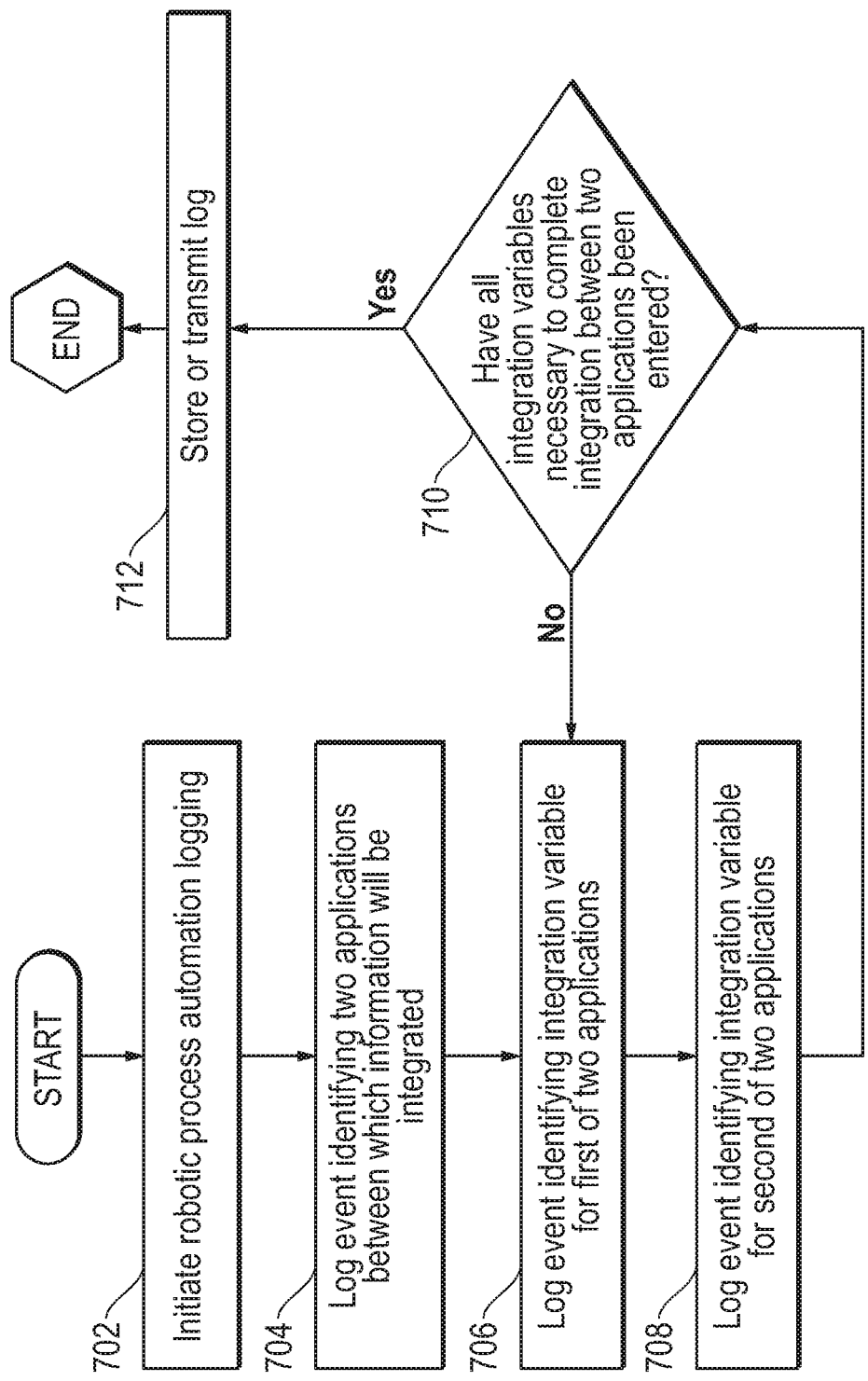

SYSTEM AND METHOD FOR AUTOMATING INTEGRATION PROCESS BUILDING BETWEEN MULTIPLE APPLICATIONS USING INTEGRATION ASSISTANCE ROBOTS

FIELD OF THE DISCLOSURE

The present disclosure relates generally to a system and method for deploying and executing customized data integration processes. More specifically, the present disclosure relates to automated generation of custom connector visual elements modeling integration processes involving multiple application programming interfaces (APIs).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which:

FIG. 7 is a flow diagram illustrating a method of recording code instructions generated by a plurality of APIs, based on received user inputs according to an embodiment of the present disclosure.

The use of the same reference symbols in different drawings may indicate similar or identical items.

DETAILED DESCRIPTION

Figure 1:
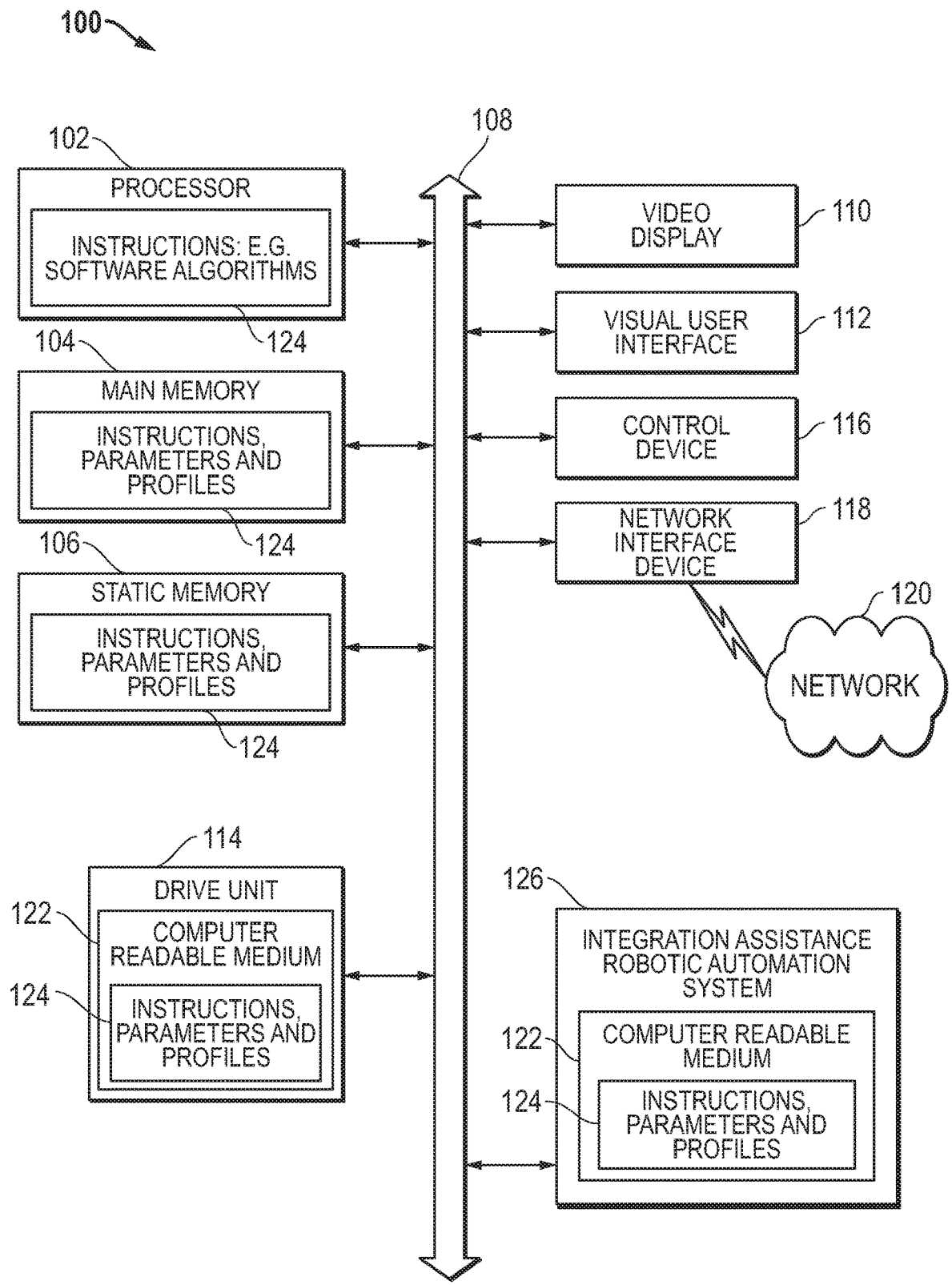
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Conventional software development and distribution models have involved development of an executable software application, and distribution of a computer-readable medium, or distribution via download of the application from the worldwide web to an end user. Upon receipt of the downloaded application, the end user executes installation files to install the executable software application on the user's personal computer (PC), or other information handling system. When the software is initially executed, the application may be further configured/customized to recognize or accept input relating to aspects of the user's PC, network, etc., to provide a software application that is customized for a particular user's computing system. This simple, traditional approach has been used in a variety of contexts, with software for performing a broad range of different functionality. While this model might sometimes be satisfactory for individual end users, it is undesirable in sophisticated computing environments.

Today, most corporations or other enterprises have sophisticated computing systems that are used both for internal operations, and for communicating outside the enterprise's network. Much of present day information exchange is conducted electronically, via communications networks, both internally to the enterprise, and among enterprises. Accordingly, it is often desirable or necessary to exchange information/data between distinctly different computing systems, computer networks, software applications, etc. The enabling of communications between diverse systems/networks/applications in connection with the conducting of business processes is often referred to as "business process integration." In the business process integration context, there is a significant need to communicate between different software applications/systems within a single computing network, e.g. between an enterprise's information warehouse management system and the same enterprise's purchase order processing system. There is also a significant need to communicate between different software applications/systems within different computing networks, e.g. between a buyer's purchase order processing system, and a seller's invoicing system. Some of these different software applications/systems may take the form of application programming interfaces (APIs).

Relatively recently, systems have been established to enable exchange of data via the Internet, e.g. via web-based interfaces for business-to-business and business-to-consumer transactions. For example, a buyer may operate a PC to connect to a seller's website to provide manual data input to a web interface of the seller's computing system, or in higher volume environments, a buyer may use an executable software application known as EDI Software, or Business-to-Business Integration Software to connect to the seller's computing system and to deliver electronically a business "document," such as a purchase order, without requiring human intervention to manually enter the data. Such software applications are available in the market today. These applications are typically purchased from software vendors and installed on a computerized system owned and maintained by the business, in this example, the buyer. The seller will have a similar/complementary software application on its system, so that the information exchange may be completely automated in both directions. In contrast to the present disclosure, these applications are purchased, installed and operated on the user's local system. Thus, the user typically owns and maintains its own copy of the system, and configures the application locally to connect with its trading partners.

In both the traditional and more recent approaches, the executable software application is universal or "generic" as to all trading partners before it is received and installed within a specific enterprise's computing network. In other words, it is delivered to different users/systems in identical, generic form. The software application is then installed within a specific enterprise's computing network (which may include data centers, etc., physically located outside of an enterprises' physical boundaries). After the generic application is installed, it is then configured and customized for a specific trading partner after which it is ready for execution to exchange data between the specific trading partner and the enterprise. For example, Walmart® may provide on its website specifications of how electronic data such as Purchase Orders and Invoices must be formatted for electronic data communication with Walmart, and how that data should be communicated with Walmart®. A supplier/enterprise is then responsible for finding a generic, commercially available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

Recently, systems and software applications have been established to provide a system and method for on-demand creation of customized software applications in which the customization occurs outside of an enterprise's computing network. These software applications are customized for a specific enterprise before they arrive within the enterprise's computing network, and are delivered to the destination network in customized form. The Dell Boomi® Application is an example of one such software application. With Dell Boomi® and other similar applications, an employee within an enterprise can connect to a website using a specially configured graphical user interface to visually model a business integration process via a flowcharting process, using only a web browser interface. During such a modeling process, the user would select from a predetermined set of process-representing visual elements that are stored on a remote server, such as the web server. By way of an example, the integration process could enable a bi-directional exchange of data between internal applications of an enterprise, between internal enterprise applications and external trading partners, or between internal enterprise applications and applications running external to the enterprise.

A customized data integration software application creation system in an embodiment may allow a user to create a customized data integration software application by modeling a data integration process flow using a visual user interface. A modeled data integration process flow in embodiments of the present disclosure may model actions taken on data elements pursuant to executable code instructions without displaying the code instructions themselves. In such a way, the visual user interface may allow a user to understand the high-level summary of what executable code instructions achieve, without having to read or understand the code instructions themselves. Similarly, by allowing a user to insert visual elements representing portions of an integration process into the modeled data integration process flow displayed on the visual user interface, embodiments of the present disclosure allow a user to identify what she wants executable code instructions to achieve without having to write such executable code instructions.

Once a user has chosen what she wants an executable code instruction to achieve in embodiments herein, the code instructions capable of achieving such a task may be generated. Code instructions for achieving a task can be written in any number of languages and/or adhere to any number of standards, often requiring a code writer to have extensive knowledge of computer science and languages. The advent of open-standard formats for writing code instructions that are both human-readable and machine executable have made the writing of code instructions accessible to individuals that do not have a high level knowledge of computer science. Such open-standard, human-readable, machine-executable file formats include extensible markup language (XML) and JavaScript Object Notification (JSON). Because code instructions adhering to these open-standard formats are more easily understood by non-specialists, many companies have moved to the use of code instructions adhering to these formats in constructing their data repository structures and controlling the ways in which data in these repositories may be accessed by both internal and external agents. In order to execute code instructions for accessing data at such a repository during a business integration process, the code instructions of the business integration process in some embodiments herein may be written in accordance with the same open-standard formats or other known, or later-developed standard formats.

In addition to the advent of open-standard, human-readable, machine-executable code instructions, the advent of application programming interfaces (APIs) designed using such open-standard code instructions have also streamlined the methods of communication between various software components. An API may operate to communicate with a backend application in a coding language in which the backend application understands. Different coding languages may use different ways of describing routines, data structures, object classes, variables, or remote calls that may be invoked and/or handled during business integration processes that involves datasets managed by the backend applications such APIs serve. Because these backend applications may use differing code languages to describe accessing and integration of such datasets, the backend applications, and their respective APIs may be incapable of direct communication with one another. In such scenarios, a user of such APIs and their backend applications may need to access datasets managed by a first application via a first API, then separately transmit the accessed dataset to a second application via a second API. This requires considerable participation on the part of the user each time the user wishes to integrate such datasets between or among the backend applications. A method capable of integrating datasets in a single integration process between or among backend applications, or their respective APIs, that are otherwise incapable of direct communication with one another that does not require such repeated user interaction is needed.

The integration assistance robotic automation system in embodiments of the present disclosure addresses this issue by providing an automated, single execution process for integrating user-specified data between user-specified and otherwise incompatible applications, based on previously recorded code instructions generated by each of the incompatible applications' APIs. Although backend applications and their respective APIs may communicate using different code languages, each of the code languages used may incorporate similar concepts. For example, each code language may describe, in differing formats, an action to be performed on a dataset that is stored at a defined location. The integration assistance robotic automation system in an embodiment may create a high-level program that can communicate these basic concepts to each backend application, in the language understood by such backend application. For example, the integration assistance robotic automation system in embodiments described herein may build a separate connector code set for communication with each of the backend applications involved in an integration process, defining an action to be taken on a dataset, and the stored location or intended future location of that dataset at the given application. The integration assistance robotic automation system in embodiments may build each separate connector code set by identifying the action, dataset, and location previously selected by a user executing the same or similar integration process in the past via APIs for the respective applications involved in the integration process. The action, dataset, and location previously selected by the user may be identified in an execution log for the previous execution stored in a memory. Each execution log may have recorded code instructions generated by the APIs with which a user interfaces to accomplish the previous integration process, and consequently, may include code instructions written in the language understood by the backend applications serviced by those APIs. The integration assistance robotic automation system in embodiments may parse these code instructions, written in the language understood by the applications managing the identified dataset, and associate parsed portions of these code instructions with the basic concepts of the user-specified action to perform on the user-identified dataset, stored at a given location.

For each application accessed in the previously executed integration process, the integration assistance robotic automation system in embodiments may combine these parsed portions of code instructions into a single connector code set. Such a connector code set may provide code instructions for performing the user-specified action on a dataset managed by one of the multiple, otherwise incompatible applications involved in the previously executed integration process, written in the code language understood by that application. Multiple of such connector code sets may be combined into a single integration process that describes the movement of a dataset directly between these otherwise incompatible applications, without any intermediate handling by a user or a user device.

The integration assistance robotic automation system in embodiments may then generate a runtime engine capable of executing these multiple connector code sets in a single process. For example, the integration assistance robotic automation system in embodiments described herein may create and transmit a runtime engine, along with each of these multiple connector code sets to a user device (e.g., within a firewalled enterprise network) for execution of the connector code sets, in an order dictated by the previously executed integration process, at the user device. Because such a runtime engine retrieves and executes pre-stored portions of code instructions taken from logged interactions between an API and its backend application, without having to generate or create any of these code instructions, the runtime engine may execute code instructions in any or multiple code languages within a single execution of the integration process. For example, the runtime engine in embodiments described herein may execute a first connector code set by transmitting instructions in a first coding language (e.g., XML) to a first application, then, in the same integration process, transmit instructions in a second language (e.g., JSON) to a second applications. In such a way, a single integration process may be executed to move a user-specified dataset between or among multiple applications otherwise incapable of communication with one another. Further, such a single execution may negate a need for user interaction with multiple APIs each time a user wishes to integrate a dataset between incompatible applications.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code 124 for the integration assistance robotic automation system 126 that may operate on servers or systems, remote data centers, or on-box in individual client information handling systems such as a local display device, or a remote display device, according to various embodiments herein. In some embodiments, it is understood any or all portions of code 124 for the integration assistance robotic automation system 126 may operate on a plurality of information handling systems 100.

The information handling system 100 may include a processor 102 such as a central processing unit (CPU), a graphics-processing unit (GPU), control logic or some combination of the same. Any of the processing resources may operate to execute code that is either firmware or software code. Moreover, the information handling system 100 can include memory such as main memory 104, static memory 106, drive unit 114, or the computer readable medium 122 of the integration assistance robotic automation system 126 (volatile (e.g. random-access memory, etc.), nonvolatile (read-only memory, flash memory etc.) or any combination thereof). Additional components of the information handling system can include one or more storage devices such as static memory 106, drive unit 114, and the computer readable medium 122 of the integration assistance robotic automation system 126. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110, such as a liquid crystal display (LCD), an organic light emitting diode (OLED), a flat panel display, a solid state display, or other display device. Additionally, the information handling system 100 may include a control device 116, such as an alpha numeric control device, a keyboard, a mouse, touchpad, fingerprint scanner, retinal scanner, face recognition device, voice recognition device, or gesture or touch screen input.

The information handling system 100 may further include a visual user interface 112. The visual user interface 112 in an embodiment may provide a visual designer environment permitting a user to define process flows between applications/systems, such as between trading partner and enterprise systems, and to model a customized business integration process. The visual user interface 112 in an embodiment may provide a menu of pre-defined user-selectable visual elements and permit the user to arrange them as appropriate to model a process and may be displayed on the video display 110. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc.

Further, the graphical user interface 112 allows the user to provide user input providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc., and dialog boxes permitting textual entries by the user, such as to describe the format and layout of a particular data set to be sent or received, for example, a Purchase Order. The providing of this input by the user results in the system's receipt of such user-provided information as an integration process data profile code set.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 114, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 114 or in a storage system (not illustrated) associated with network interface device 118 or any combination thereof. Application programs 124, and BIOS/FW code 124 can each be implemented as single programs, or as separate programs carrying out the various features as described herein. Application program interfaces (APIs) such as WinAPIs (e.g. Win32, Win32s, Win64, and WinCE), proprietary APIs such as SalesForce™ and Oracle™ Netsuite, or an API adhering to a known open source specification (e.g., Swagger) may enable application programs 124 to interact or integrate operations with one another.

In an example of the present disclosure, instructions 124 may execute software for generating multiple connector code sets, each adhering to a different programming language for performing a dataset integration between two or more applications otherwise incapable of direct communication with one another. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 114, and the integration assistance robotic automation system 126 may include a computer-readable medium 122 such as a magnetic disk, or a solid-state disk in an example embodiment. The computer-readable medium of the memory, storage devices and the integration assistance robotic automation system 104, 106, 114, and 126 may store one or more sets of instructions 124, such as software code corresponding to the present disclosure.

The disk drive unit 114, static memory 106, and computer readable medium 122 of the integration assistance robotic automation system 126 also contain space for data storage such as an information handling system for managing locations of executions of customized integration processes in endpoint storage locations. Connector code sets, and trading partner code sets may also be stored in part in the disk drive unit 114, static memory 106, or computer readable medium 122 of the integration assistance robotic automation system 126 in an embodiment. In other embodiments, data profile code sets, and run-time engines may also be stored in part or in full in the disk drive unit 114, static memory 106, or computer readable medium 122 of the integration assistance robotic automation system 126. Further, the instructions 124 of the integration assistance robotic automation system 126 may embody one or more of the methods or logic as described herein.

In a particular embodiment, the instructions, parameters, and profiles 124, and the integration assistance robotic automation system 126 may reside completely, or at least partially, within the main memory 104, the static memory 106, disk drive 114, and/or within the processor 102 during execution by the information handling system 100. Software applications may be stored in static memory 106, disk drive 114, and the integration assistance robotic automation system 126.

Network interface device 118 represents a NIC disposed within information handling system 100, on a main circuit board of the information handling system, integrated onto another component such as processor 102, in another suitable location, or a combination thereof. The network interface device 118 can include another information handling system, a data storage system, another network, a grid management system, another suitable resource, or a combination thereof.

The integration assistance robotic automation system 126 may also contain computer readable medium 122. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the integration assistance robotic automation system 126. The Integration assistance robotic automation system 126 may be operably connected to the bus 108. The integration assistance robotic automation system 126 is discussed in greater detail herein below.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, or module can include software, including firmware embedded at a device, such as a Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the Integration assistance robotic automation system 126 above and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
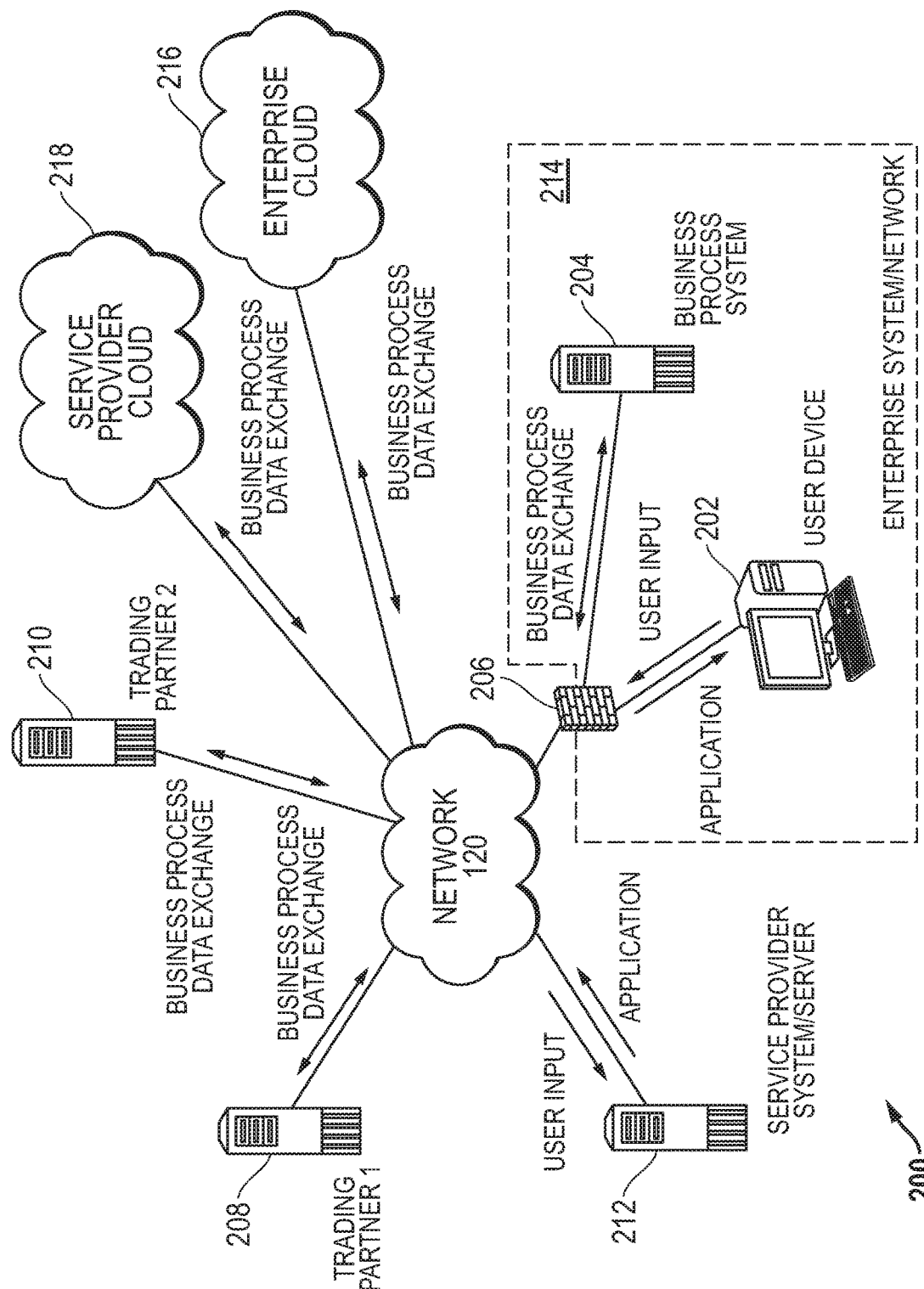
FIG. 2 is a block diagram illustrating a simplified integration network according to an embodiment of the present disclosure.

FIG. 2 is a graphical diagram illustrating a simplified integration network 200 including a service provider system/server 212 and an enterprise system/network 214 in an embodiment according to the present disclosure. Actual integration network topology could be more complex in some other embodiments. As shown in FIG. 2, an embodiment may include conventional computing hardware of a type typically found in client/server computing environments. More specifically, the integration network 200 in an embodiment may include a conventional user/client device 202, such as a conventional desktop or laptop PC, enabling a user to communicate via the network 120, such as the Internet. In another aspect of an embodiment, the user device 202 may include a portable computing device, such as a computing tablet, or a smart phone. The user device 202 in an embodiment may be configured with conventional web browser software, such as Google Chrome®, Firefox®, or Microsoft Corporation's Internet Explorer® for interacting with websites via the network 120. In an embodiment, the user device 202 may be positioned within an enterprise network 214 behind the enterprise network's firewall 206, which may be of a conventional type. As a further aspect of an embodiment, the enterprise network 214 may include a business process system 204, which may include conventional computer hardware and commercially available business process software such as QuickBooks, SalesForce's™ Customer Relationship Management (CRM) Platform, Oracle's™ Netsuite Enterprise Resource Planning (ERP) Platform, Infor's™ Warehouse Management Software (WMS) Application, or many other types of databases.

In an embodiment, the integration network 200 may further include trading partners 208 and 210 operating conventional hardware and software for receiving and/or transmitting data relating to business-to-business transactions. For example, Walmart® may operate trading partner system 208 to allow for issuance of purchase orders to suppliers, such as the enterprise 214, and to receive invoices from suppliers, such as the enterprise 214, in electronic data form as part of electronic data exchange processes. Electronic data exchange process in an embodiment may include data exchange via the world wide web. In other embodiments, electronic data exchange processes may include data exchange via File Transfer Protocol (FTP) or Secure Shell File Transfer Protocol (SFTP).

In an embodiment, a provider of a service ("service provider") for creating on-demand, real-time creation of customized data integration software applications may operate a service provider server/system 212 within the integration network 200. The service provider system/server 212 may be specially configured in an embodiment, and may be capable of communicating with devices in the enterprise network 214. The service provider system/server 212 in an embodiment may host an integration process-modeling user interface in an embodiment. Such an integration process-modeling user interface may allow a user or the integration assistance robotic automation system to model an integration process including one or more sub-processes for data integration through a business process data exchange between an enterprise system/network 214 and outside entities or between multiple applications operating at the business process system 204. The integration process modeled in the integration process-modeling user interface in an embodiment may be a single business process data exchange shown in FIG. 2, or may include several business process data exchanges shown in FIG. 2. For example, the enterprise system/network 214 may be involved in a business process data exchange via network 120 with a trading partner 1, and/or a trading partner 2. In other example embodiments, the enterprise system/network 214 may be involved in a business process data exchange via network 120 with a service provider located in the cloud 218, and/or an enterprise cloud location 216. For example, one or more applications between which a dataset may be transferred, according to embodiments described herein, may be located remotely from the enterprise system 214, at a service provider cloud location 218, or an enterprise cloud location 216.

The integration assistance robotic automation system may be used by a user of an integration process-modeling user interface in an embodiment to model one or more business process data exchanges via network 120 within an integration process by adding one or more connector integration elements or code sets to an integration process flow. These connector integration elements in an embodiment may model the ways in which a user wishes data to be accessed, moved, and/or manipulated during the one or more business process data exchanges. Each connector element the integration assistance robotic automation system or the user adds to the integration process flow diagram in an embodiment may be associated with a pre-defined subset of code instructions stored at the service provider systems/server 212 in an embodiment. Upon the user modeling the integration process, the service provide system/server 212 in an embodiment may generate a run-time engine capable of executing the pre-defined subsets of code instructions represented by the connector integration elements chosen by the user or indicated by the integration assistance robotic automation system. The runtime engine may then execute the subsets of code instructions in the order defined by the modeled flow of the connector integration elements given in the integration process flow diagram. In some embodiments, the integration assistance robotic automation system may define the order in which such subsets of code instructions are executed by the runtime engine without creation of or reference to a visual integration process flow diagram. In such a way, an integration process may be executed without the user having to access, read, or write the code instructions of such an integration process.

In other aspects of an embodiment, a user may initiate a business process data exchange between one cloud service provider 218 and one cloud enterprise 216, between multiple cloud service providers 218 with which the enterprise system 214 has an account, or between multiple cloud enterprise accounts 216. For example, enterprise system 214 may have an account with multiple cloud-based service providers 218, including a cloud-based SalesForce™ CRM account and a cloud-based Oracle™ Netsuite account. In such an embodiment, the enterprise system 214 may initiate business process data exchanges between itself, the SalesForce™ CRM service provider and the Oracle™ Netsuite service provider via a plurality of Application Program Interfaces (APIs) operating to guide interaction and communication between the enterprise system 214 and each of the cloud service providers 218.

Portions of such APIs may operate as user interfaces in part or in whole on the business process system 204 or user device 202 within the enterprise system 214 to receive user requests to access information stored at the one or more cloud service providers 218, at the enterprise cloud 216, or at the business process system 204, and to execute code instructions to retrieve or transmit the identified information among the business process system 204, the enterprise cloud 216, or the cloud service provider 218, via network 120, or wholly within the enterprise network 214. For example, a user of the user device 202 may initiate a request to get a name of a stored account from the SalesForce™ CRM service provider via the SalesForce™ API operating on the user device 202. As another example, the user of the user device 202 may initiate a request to transmit a customer name matching the retrieved account name to the Oracle™ Netsuite service provider via the Oracle™ Netsuite API operating on the user device 202. In such a way, a user device 202 may initiate two separate business process data exchanges (e.g., between the enterprise system 214 and the SalesForce™ provider, and between the enterprise system 214 and the Oracle™ Netsuite service provider) in order to integrate data stored in a specific location at a first cloud service provider 218 to a specific location at a second cloud service provider 218. In other embodiments, one or both of such applications between which data is to be integrated may be located at the user device 202, the business process system 204, or the enterprise cloud 216.

The integration assistance robotic automation system in an embodiment may record commands received between multiple APIs operating within the enterprise system 214, streamline those commands into a single business process data exchange, and automate future executions of the single business process data exchange. An integration assistance robotic automation system operating at least partially at the service provider system/server 212 and within the enterprise system 214 in an embodiment may monitor, log, and time-stamp code instructions generated by multiple APIs operating within the enterprise system 214, pursuant to received user instructions. For example, the integration assistance robotic automation system in an embodiment may log or record code instructions generated by the SalesForce™ API operating on the user device 202, pursuant to a user instruction to get a name of a stored account from the SalesForce™ CRM service provider. As another example, the integration assistance robotic automation system in an embodiment may log or record code instructions generated by the Oracle™ Netsuite API operating on the user device 202, pursuant to user instructions to transmit a customer name matching the retrieved account name to the Oracle™ Netsuite service provider.

The integration assistance robotic automation system operating at the enterprise system 214 or the service provider system 212 in such an embodiment may then parse such logs to identify endpoints, data profiles, or profile parameters needed to generate a connector element or connector code set for insertion within an integration process stored at the service provider system 212. For example, the user device 202 may transmit the recorded activity logs to the service provider system 212, where they may be parsed to identify a starting point at the SalesForce™ CRM service provider and an endpoint at the Oracle™ Netsuite service provider. The integration assistance robotic automation system operating at the service provider system 212 in such an embodiment may create connector code sets for insertion within an integration process that identify these starting point and end point, as well as information identifying the specifically stored data to be transmitted there between (e.g., the account name from the SalesForce™ CRM service provider).

The integration assistance robotic automation system in an embodiment may then transmit a runtime engine, along with the created connector code sets to the enterprise system 214 for later execution. The user of the user device 202 in such an embodiment may initiate the runtime engine for automatic initiation of the exchange of the account name stored at the SalesForce™ CRM service provider to the user-defined storage location at the Oracle™ Netsuite service provider. In some embodiments, the runtime engine may automatically initiate such exchanges according to a user-defined scheduler. In such a way, the user may initiate such exchanges without repeatedly accessing multiple APIs (e.g., SalesForce™ API, and Oracle™ Netsuite API).

Figure 3:
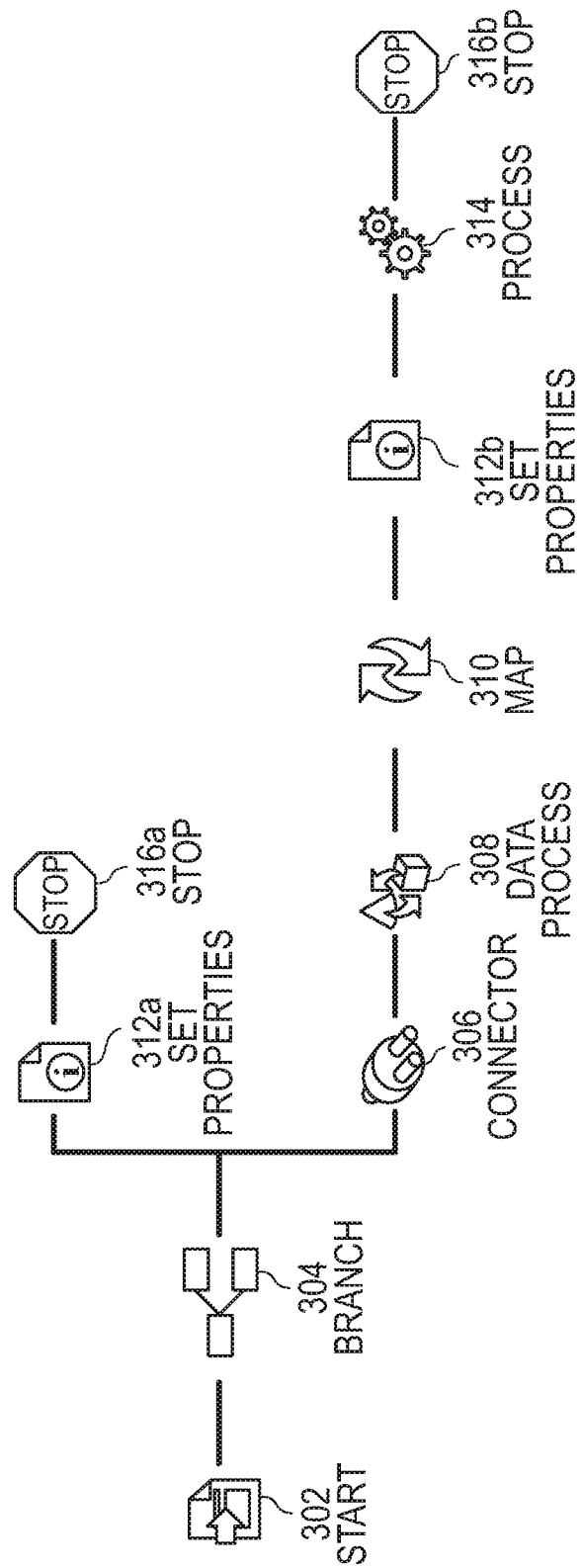
FIG. 3 is a graphical diagram illustrating a user-generated flow diagram of an integration process according to an embodiment of the present disclosure.

FIG. 3 is a graphical diagram illustrating a user-generated flow diagram of an integration process for exchange of electronic data records according to an embodiment of the present disclosure. An integration assistance robotic automation system or a user may generate a flow diagram in an embodiment by providing a chronology of process-representing integration elements via the use of an integration process-modeling user interface. In some embodiments, the integration process-modeling user interface may take the form of a visual user interface. In such embodiments, the user-selectable elements representing integration sub-processes (e.g. connector integration elements) may be visual icons. In other embodiments, the integration assistance robotic automation system may generate the flow diagram based on user selections received at a plurality of APIs, as described in greater detail herein. In such embodiments, the integration assistance robotic automation system may generate a visual flowchart that can be viewed by a user, or may generate a process flow, such as the one modeled by the visual flowchart in FIG. 3, without representing the elements for visual inspection by a user.

An integration process-modeling user interface in an embodiment may provide a design environment permitting a user, or the integration assistance robotic automation system to define process flows between applications/systems, such as between trading partner and enterprise systems, between on-site data centers and cloud-based storage modules, or between multiple applications incapable of direct communication with one another, and to model a customized business integration process. Such an integration process-modeling user interface in an embodiment may provide a menu of pre-defined user-selectable elements representing integration sub-processes and permit the user or the integration assistance robotic automation system to arrange them as appropriate to model a full integration process. For example, in an embodiment in which the integration process-modeling user interface is a visual user interface, the elements may include visual, drag-and-drop icons representing specific units of work (known as process components) required as part of the integration process. In other embodiments, the integration assistance robotic automation system may define the process flow without use of a visual interface by providing a chronological list of executable subsets of code instructions. In such embodiments, the visual elements depicted in FIG. 3 may fairly represent the flow in which those subsets of code instructions may be executed on data sets passing through the integration process, as directed by the integration assistance robotic automation system. Such a process component in an embodiment may include invoking an application-specific connector to access, and/or manipulate data. In other embodiments, process components may include tasks relating to transforming data from one format to another, routing data down multiple paths of execution by examining the contents of the data, and business logic validation of the data being processed, among other tasks.

Each process component, as represented by integration sub-process icons or elements, may be identifiable by a process component type and may further include an action to be taken. For example, a process component may be identified as a "connector" component. Each "connector" component, when chosen and added to the process flow in the integration process-modeling user interface, may allow the integration assistance robotic automation system or a user to choose from different actions the "connector" component may be capable of taking on the data as it enters that process step. Further the integration-process modeling user interface in an embodiment may allow the user or the integration assistance robotic automation system to choose the data set or data element upon which the action will be taken. The action and data element the user or the integration assistance robotic automation system chooses may be associated with a connector code set, which may be pre-defined and stored at a system provider's memory in an embodiment. The system provider server/system in an embodiment may generate a dynamic runtime engine for executing these pre-defined subsets of code instructions correlated to each individual process-representing visual element (process component) in a given flow diagram in the order in which they are modeled, or by the integration assistance robotic automation system in a non-visual format.

As shown in FIG. 3, such process-representing visual elements may include a start element 302, a connector element 306, and stop elements 316a and 316b. Other embodiments may also include a branch element 304, a data process element 308, a process call element 314, set properties elements 312a and 312b, and a map element 310. A connector element 306, and a start element 302 in an embodiment may represent a sub-process of an integration process describing the accessing and/or manipulation of data via an API.

In an embodiment, a start element 302 may operate to begin a process flow, and a stop element 316a and stop element 316b may operate to end a process flow. As discussed above, each visual element may require user input in order for a particular enterprise or trading partner to use the resulting process. The start element 302 in an embodiment may further allow or require the user or the integration assistance robotic automation system to provide data attributes unique to the user's specific integration process, such as, for example, the source of incoming data to be integrated. For example, the user or the integration assistance robotic automation system may use a connector element to define a connection (e.g., an application managing data upon which action is to be taken), and the action to be taken. A user or the integration assistance robotic automation system may use a connector element to further define a location of such data, according to the language and storage structure understood by the application managing such data. The integration assistance robotic automation system or a user may do so in an embodiment by specifying such a location within a "parameters" sub-menu of the connector element.

In some embodiments, the user or the integration assistance robotic automation system may also use a connector element to define a type of operation to perform on incoming or outgoing data sets. The start element 302 in an embodiment may also operate as a connector element. The user or the integration assistance robotic automation system may identify the source of incoming data to be integrated in some embodiments based on previous user selections recorded at one or more APIs of the user system, as described herein.

A set properties element (e.g., 312a or 312b) in an embodiment may allow the user or the integration assistance robotic automation system to set values identifying specific files. Set properties elements in an embodiment may associate a user-defined property with a user-defined parameter, similar to a key-value pair definition. For example, a user or the integration assistance robotic automation system in an embodiment may use a set properties element to set the property "file name" to a parameter "Shipping Address," in order to identify a specific data file entitled "Shipping Address."

The code sets associated with such property and parameter fields in an embodiment may be written in any programming code language, so long as the code language in which the property is defined matches the code language in which the parameter is also defined. Similarly, the code sets associated with the connection location and action to be taken within a connector element may be written in any programming code language so long as they are consistent with one another. Thus, the process-representing elements in an embodiment may be programming language-agnostic. Using such process-representing elements in an embodiment, a user, or the integration assistance robotic automation system may model an end-to-end integration process between two applications incapable of direct communication with one another.

In other embodiments in which a visual user interface is not employed, the integration assistance robotic automation system may provide an automated, single execution process for integrating user-specified data between user-specified and otherwise incompatible applications, based on previously recorded code instructions generated by each of the applications' APIs for integration. The integration assistance robotic automation system in an embodiment may build a separate connector code set for communication with each of the backend applications involved in an integration process, in the coding language understood by that backend application, defining an action to be taken on a dataset, and the stored location or intended future location of that dataset at the given application. Multiple of such connector code sets may be combined into a single integration process that describes the movement of a dataset directly between these otherwise incompatible applications, without any intermediate handling by a user or a user device.

Figure 4A:
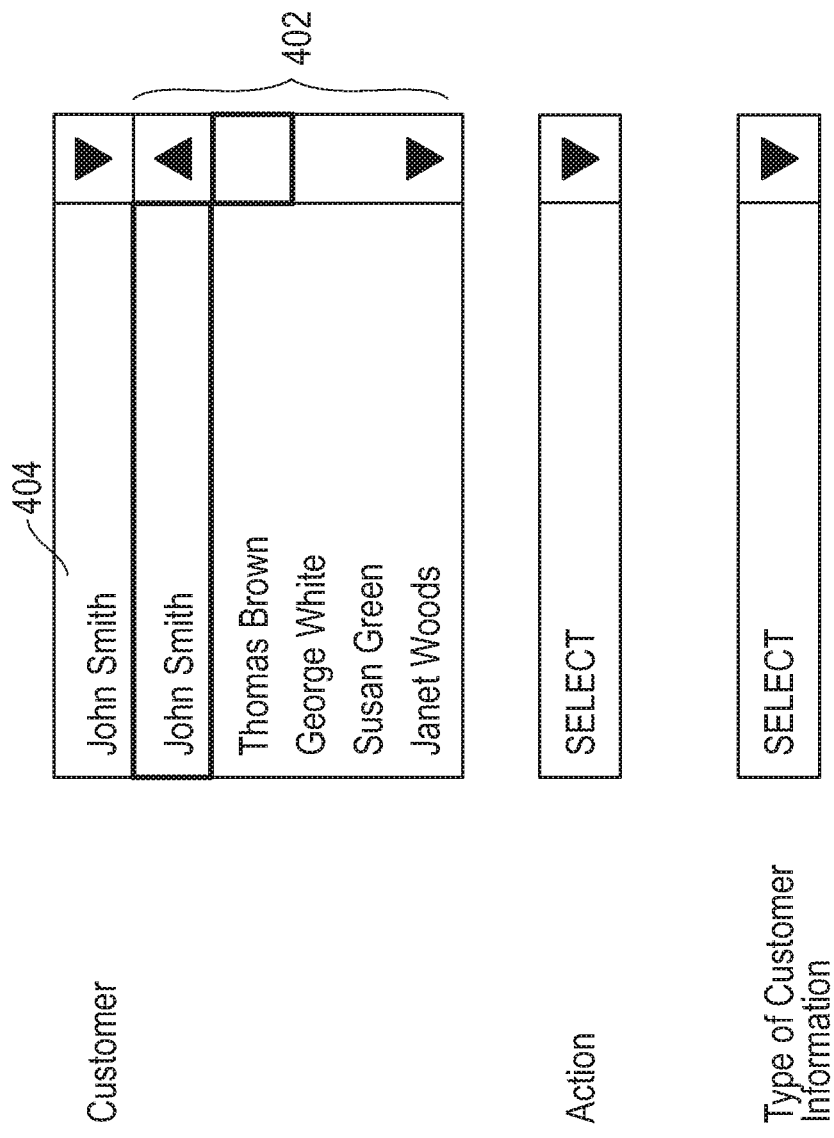
FIG. 4A is a graphical diagram illustrating a first application programming interface (API) user interface for choosing a customer name according to an embodiment of the present disclosure.

FIG. 4A is a graphical diagram illustrating a first application programming interface (API) user interface, through which a user may select actions to be taken on data elements stored remotely, or managed by a third party for choosing a customer name according to an embodiment of the present disclosure. As described herein, a user may perform a business process data exchange or data integration process between multiple applications (e.g., PC-based applications, or cloud-based applications) by interfacing with a separate API for each application. An API may receive a user request via a user interface, and generate code instructions written in a code language understood by the application the API services in order to execute the user request. The integration assistance robotic automation system operating at least partially at a user device in an embodiment may monitor, log, and timestamp code instructions generated by such multiple APIs, pursuant to received user instructions, in order to streamline and automate future executions of similar business process data exchanges. FIG. 4A illustrates an example API user interface for an enterprise resource planning (ERP) platform operating to manage daily business activities, such as accounting, procurement, and supply chain operations, for example. Oracle™ Netsuite is one example of an ERP, but other ERPs and other non-ERP applications are also contemplated.

An ERP may store and manage information relating to customer accounts, such as information relating to previous sales to a given customer, in an example embodiment. As described herein, an API may operate to communicate with a backend application in a coding language in which the backend application understands. Different coding languages may use different ways of describing routines, data structures, object classes, variables, or remote calls that may be invoked and/or handled during business integration processes that involves datasets managed by the backend applications such APIs serve. Because these backend applications may use differing code languages to describe accessing and integration of such datasets, the backend applications, and their respective APIs may be incapable of direct communication with one another. In such scenarios, a user of such APIs and their backend applications may need to access datasets managed by a first application via a first API, then separately transmit the accessed dataset to a second application via a second API.

In order to access such customer account information, a user in an embodiment may request such information via an ERP API like the one illustrated in FIG. 4A. An ERP API in an embodiment may allow a user to choose a specific customer, and a specific type of action to perform on a particular type of information relating to that customer. For example, the user may use a drop down menu 402 to identify a customer "John Smith" 404 from a list of available customers.

Figure 4B:
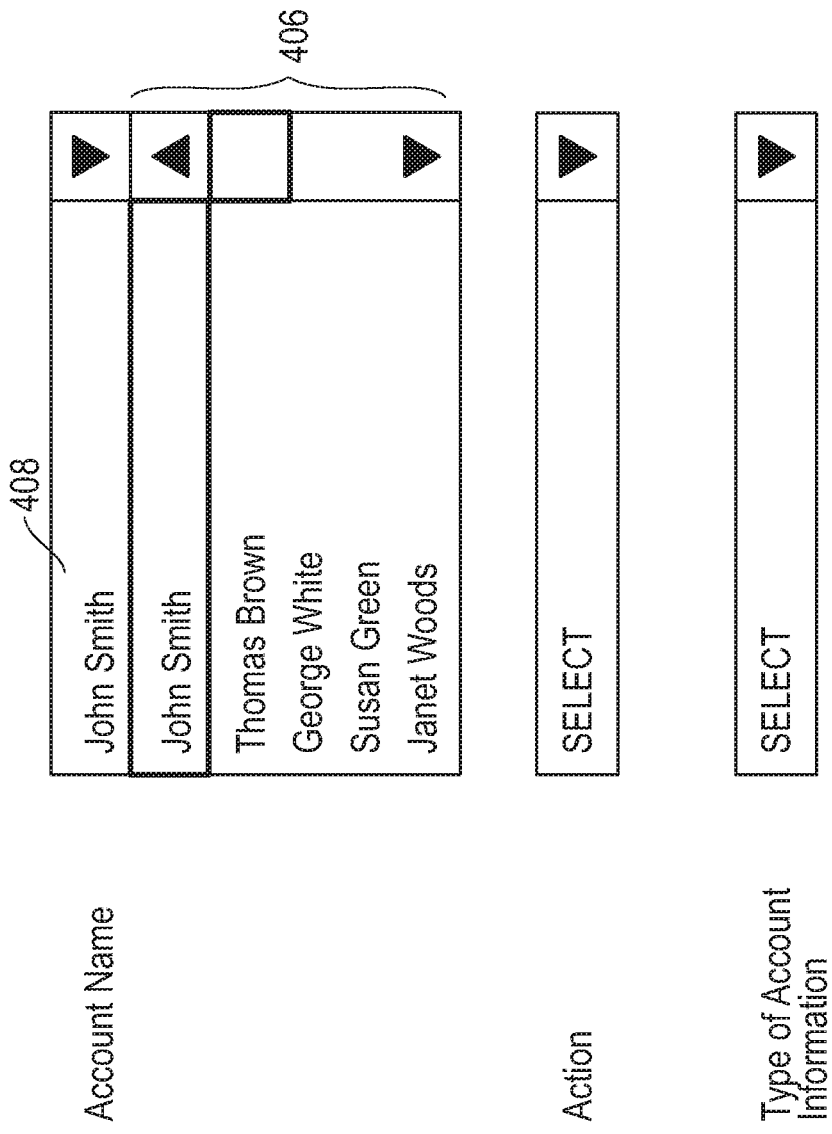
FIG. 4B is a graphical diagram illustrating a second application programming interface (API) user interface for choosing an account name according to an embodiment of the present disclosure.

FIG. 4B is a graphical diagram illustrating a second application programming interface (API) user interface, through which a user may select actions to be taken on data elements stored remotely, or managed by a third party for choosing an account name according to an embodiment of the present disclosure. As described herein, a user may interface with a separate API for each application in order to perform a business process data exchange or data integration process between multiple applications. FIG. 4B illustrates an example API user interface for a customer resource planning (CRM) platform operating to manage customer relations, such as sales histories and trends, customer services, and analytics assisting to determine which customers are most likely to purchase which products in which industries. SalesForce™ CRM is one example of a CRM, but other CRMs and other non-CRM applications are also contemplated.

An CRM may store and manage information relating to specific accounts, such as information relating to previous purchases made by a given customer, in an example embodiment. The information stored and managed by the CRM platform in an embodiment may be similar to, or partially or wholly identical to some information stored within the ERP platform. For example, an ERP platform may track prior sales to a customer "John Smith" for the accounting and payment purposes, while the CRM platform tracks the same prior sales to the same customer "John Smith" for marketing purposes, such as forecasting the likelihood "John Smith" may also purchase the same or similar items in the future. Although both the ERP platform and the CRM platform may store and manage the same types of information, the structure of the ERP platform may be different than the structure of the CRM platform. Further, the ERP application served by the ERP API may only understand code instructions in a language the CRM application cannot process. Thus, in order to share such identical or similar information between the two platforms, a data integration process that takes into account such separate structures and code languages must be performed. One way to perform such an integration process is to retrieve the information stored in one of the two platforms (e.g., the ERP platform) via an API for the first of the two platforms (e.g., the ERP API), and transfer the received information to the second of the two platforms (e.g., the CRM platform) via the API for the second of the two platforms (e.g., the CRM API).

In order to transmit such account information to the CRM platform, a user in an embodiment may identify the location or purpose of such information via a CRM API like the one illustrated in FIG. 4B. A CRM API in an embodiment may allow a user to choose a specific account, and a specific type of action to perform on a particular type of information relating to that account. For example, in order to transmit information received from the ERP API regarding the account "John Smith," the user may use a drop down menu 406 within the CRM API to identify the account "John Smith" 408 from a list of available customers.

Figure 5A:
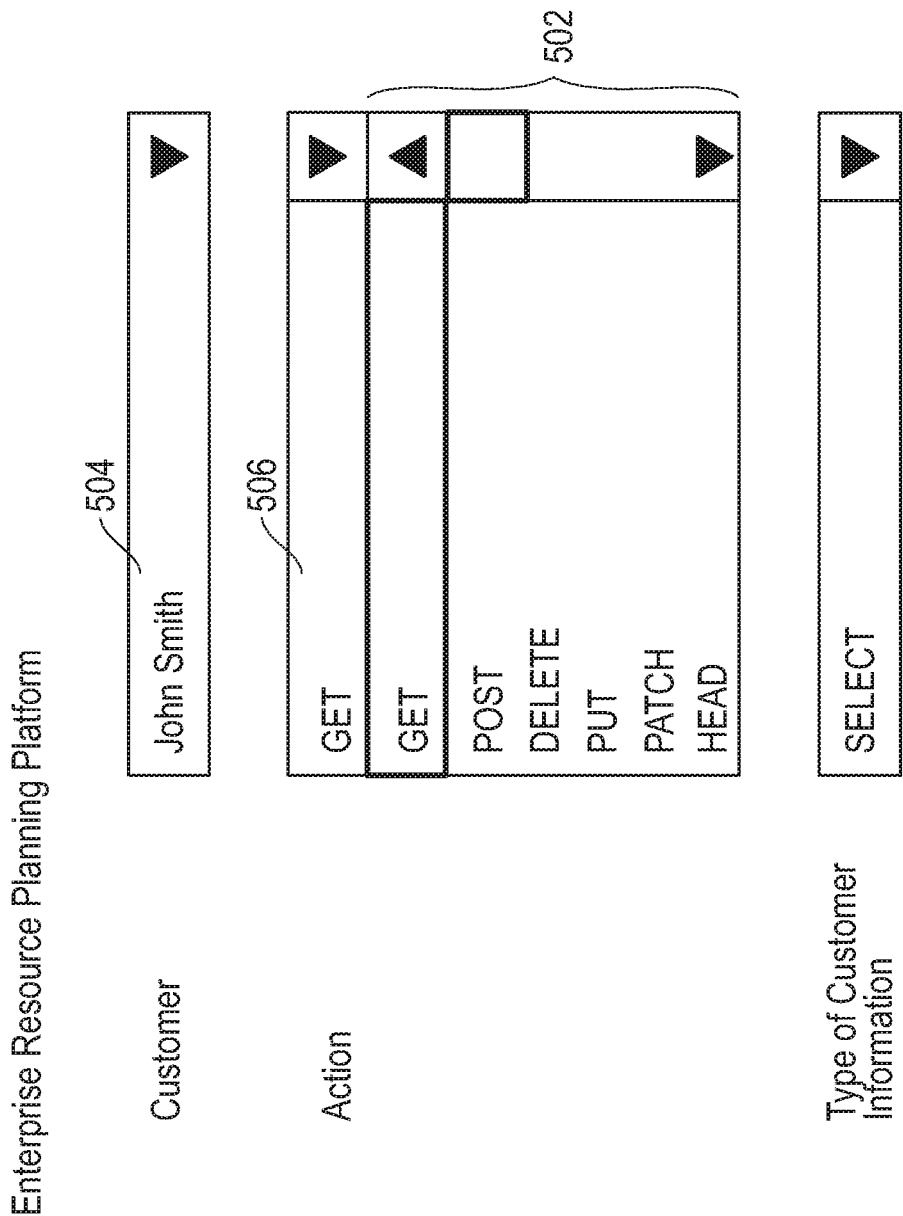
FIG. 5A is a graphical diagram illustrating a first application programming interface (API) user interface for choosing an action to be taken according to an embodiment of the present disclosure.

FIG. 5A is a graphical diagram illustrating a first application programming interface (API) user interface, through which a user may select actions to be taken on data elements stored remotely, or managed by a third party for choosing an action to be taken according to an embodiment of the present disclosure. As described herein, an ERP API in an embodiment may allow a user to choose a specific customer, and a specific type of action to perform on a particular type of information relating to that customer. For example, in order to retrieve customer information stored and managed by the ERP, a user may choose to "get" a particular type of customer information relating to the customer "John Smith" 504 by choosing the action "get" 506 from the drop down menu 502 in the ERP API in an embodiment.

Figure 5B:
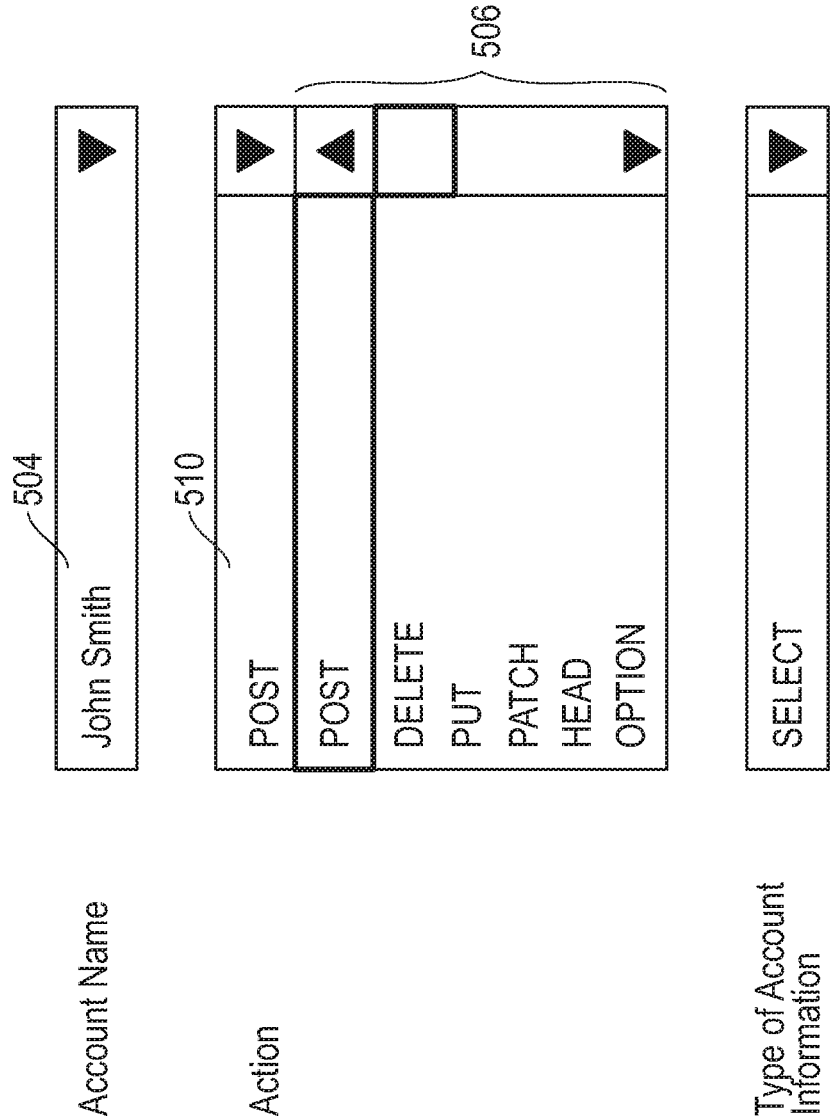
FIG. 5B is a graphical diagram illustrating a second application programming interface (API) user interface for choosing an action to be taken according to an embodiment of the present disclosure.

FIG. 5B is a graphical diagram illustrating a second application programming interface (API) user interface, through which a user may select actions to be taken on data elements stored remotely, or managed by a third party for choosing an action to be taken according to an embodiment of the present disclosure. As described herein, A CRM API in an embodiment may allow a user to choose a specific account, and a specific type of action to perform on a particular type of information relating to that account. For example, in order to store customer information for management by the CRM, a user may choose to "post" a particular type of customer information relating to the account "John Smith" 508 by choosing the action "post" 510 from the drop down menu 506 in the CRM API in an embodiment.

Figure 6A:
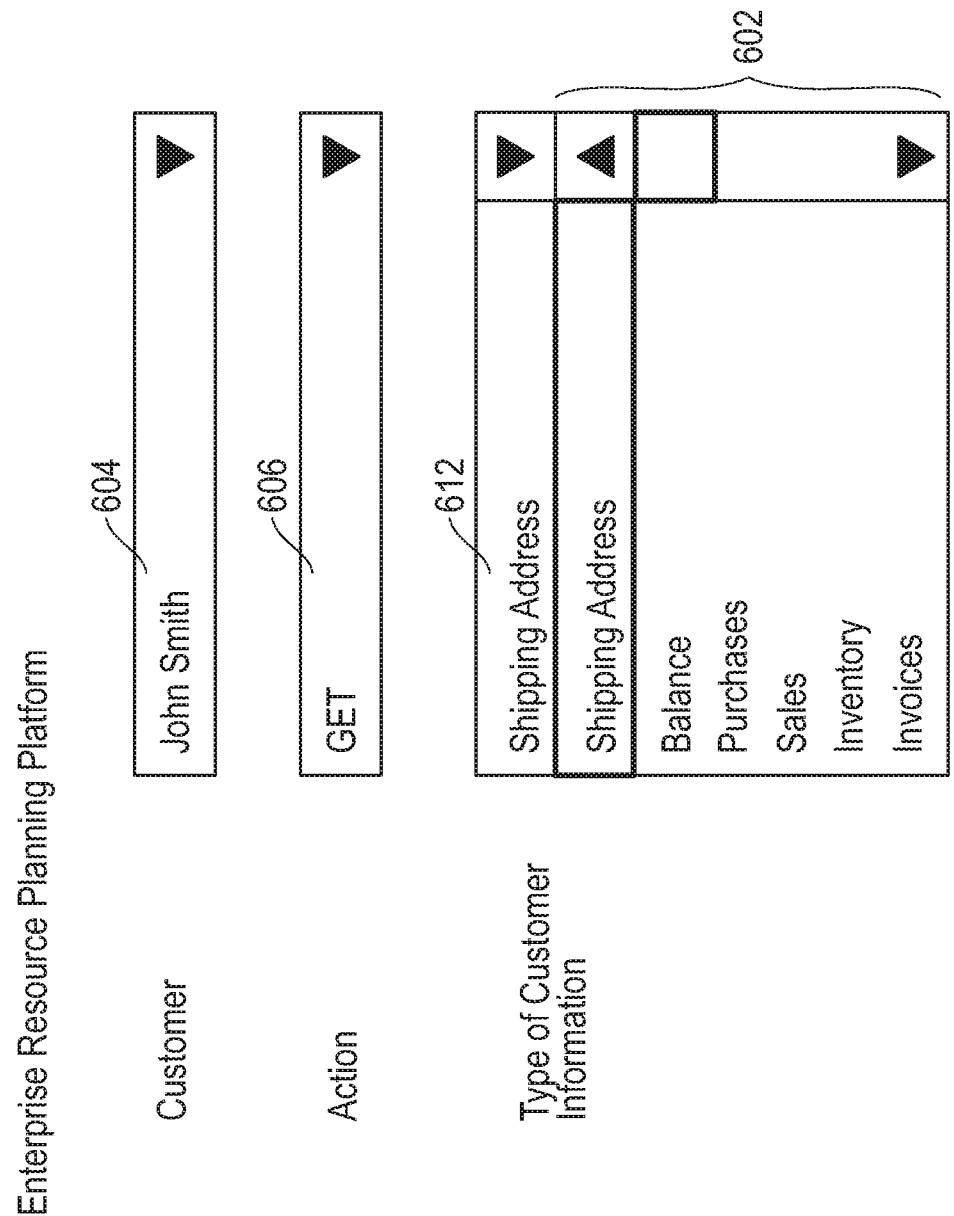
FIG. 6A is a graphical diagram illustrating a first application programming interface (API) user interface for choosing a type of customer information according to an embodiment of the present disclosure.

FIG. 6A is a graphical diagram illustrating a first application programming interface (API) user interface, through which a user may select actions to be taken on data elements stored remotely, or managed by a third party for choosing a type of customer information according to an embodiment of the present disclosure. Once the user has determined an action to take on information associated with a specific account in an embodiment, the user may also identify a specific type of information upon which to perform that action. For example, the user may choose to get 606 a shipping address for the customer "John Smith" 604 using the ERP API by choosing "Shipping Address" 612 from the drop down menu 602 in an embodiment.

Figure 6B:
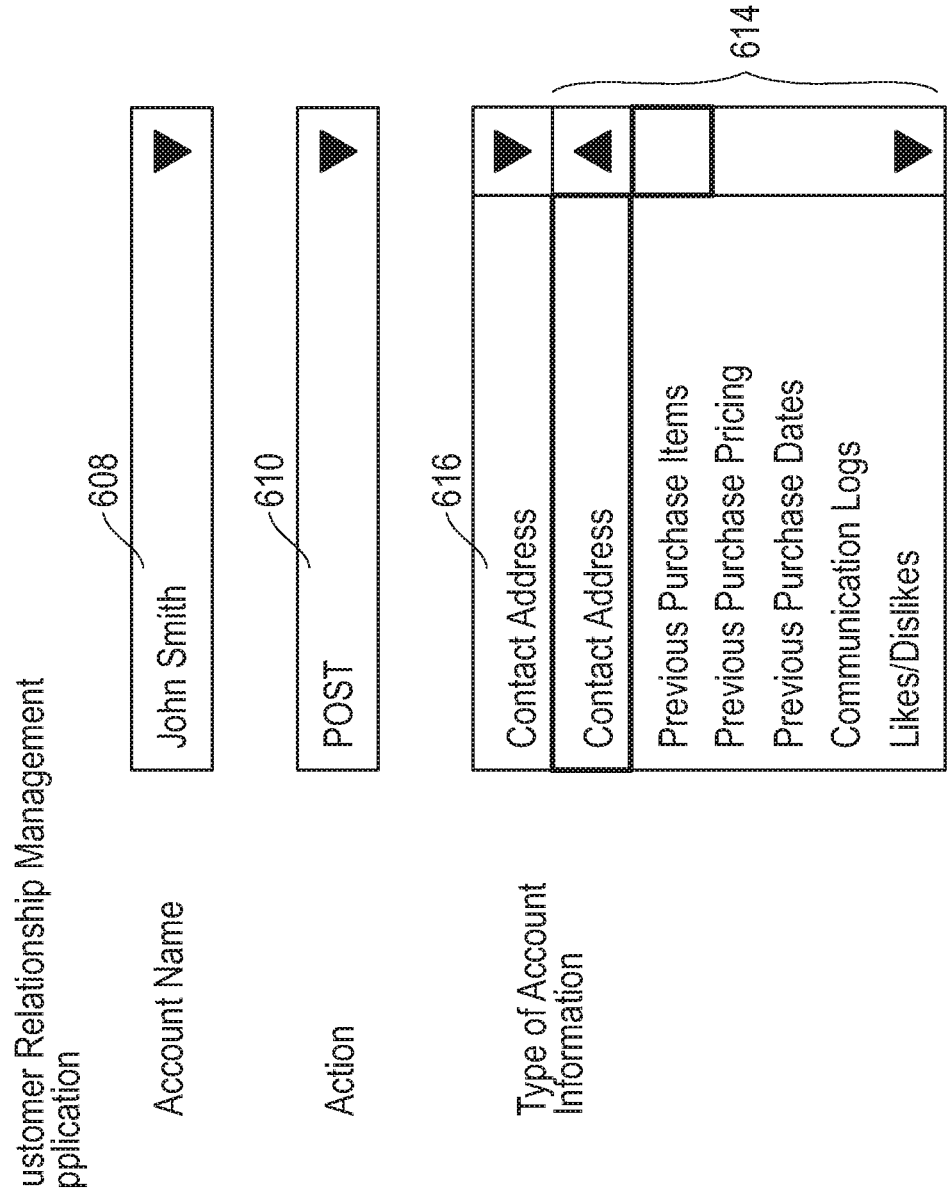
FIG. 6B is a graphical diagram illustrating a second application programming interface (API) user interface for choosing a type of account information according to an embodiment of the present disclosure.

FIG. 6B is a graphical diagram illustrating a second application programming interface (API) user interface, through which a user may select actions to be taken on data elements stored remotely, or managed by a third party for choosing a type of account information according to an embodiment of the present disclosure. Once the user has identified the information she wishes to integrate from the first application (e.g., ERP platform) to the second application (e.g., CRM platform), she may describe that information for storage at the CRM platform using the CRM API. For example, a user wishing to post 610 a contact address for the account "John Smith" 608 from an ERP platform using the CRM API may identify that information as "Contact Address" 616 within the CRM API by choosing "Contact Address" 616 from the drop down menu 614 in an embodiment.

FIG. 7 is a flow diagram illustrating a method of recording code instructions generated by a plurality of APIs, based on received user instructions for performing a manual integration of data between the applications supported by such APIs according to an embodiment of the present disclosure. As described herein, a user may initiate a business process data exchange between one PC-based or cloud-based application and another via a plurality of Application Program Interfaces (APIs) operating to guide interaction and communication between the applications. Portions of such APIs may operate as user interfaces to receive user requests to access information stored and maintained by the applications (e.g., SalesForce™ CRM, or Oracle™ Netsuite ERP). The integration assistance robotic automation system in an embodiment may record code instructions generated by multiple APIs operating within the enterprise system, pursuant to these received user instructions, streamline those commands into a single business process data exchange, and automate future executions of the single business process data exchange.

Application programming interfaces may operate to receive user instructions from a user interface, and translate those user instructions into executable code instructions understood by the application such an API serves. For example, an ERP platform may execute commands written in accordance with a first code language or specification (e.g., XML), while a CRM platform executes commands written in accordance with a second, separate code language or specification (e.g., JSON). The format in which file names, file attributes, file locations, and actions to be taken on files are communicated may vary widely between differing code languages or specifications. For example, a location of a file named "shipping address," associated with a customer "John Smith," accessible via a URL "http://www.ERPPlatform.com/John_Smith/Shipping_Address may be identified in XML using the code instructions:

<Title> Shipping Address—John Smith
<SourceUrl>http://www.ERPPlatform.com/John_Smith/
  Shipping_Address.doc In contrast, and as another example, a location of a file named "contact address," associated with an account "John Smith," may be identified in JSON using the code instructions:

paths:
  /John_Smith/{Contact_Address}:
post:
  summary: Posts a contact address by account name.
  parameters:
    in: path
    name: Contact_Address
    type: integer
    required: true
    description: Contact_Address of the account to post to.

Because the code instruction language understood by a first API may not match the code instruction language understood by the second API, the two APIs may not be capable of communicating directly with one another. Thus, an integration process capable of communicating with both APIs may be needed. The integration assistance robotic automation system in an embodiment may provide such translation services by recording the code instructions used by each API to communicate with the application it serves, in the language understood by that application, then creating a single integration process capable of interacting with each API, in its respectively understood language, to complete an integration between two APIs incapable of direct communication with one another.

At block 702, the integration assistance robotic automation system may initiate a robotic process automation recording. In an embodiment, a portion of the integration assistance robotic automation system operating at a user's device (e.g., an information handling system executing the APIs through which the user is performing the integration process between applications) may begin logging or recording commands generated by the APIs, pursuant to received user instructions. The integration assistance robotic automation system may do so in an embodiment through the use of a Robotic Process Automation (RPA), which may operate to record certain executable code instructions generated by an API. These executable code instructions in an embodiment may be recorded or stored in a human-readable, machine-executable file format. In some embodiments, a user may initiate the RPA to record executable code instructions generated by two or more APIs the user interfaces with to execute multiple integration processes between multiple applications.

The integration assistance robotic automation system in an embodiment may log an event identifying two or more applications between which information will be integrated at block 704. As described herein, because backend applications served by APIs may use differing code languages to describe accessing and integration of such datasets, the backend applications, and their respective APIs may be incapable of direct communication or require customization for effective communication with one another. In such scenarios, in order to integrate data between such incompatible applications, a user of such APIs and their backend applications may need to access datasets managed by a first application via a first API, then separately transmit the accessed dataset to a second application via a second API. Thus, a user may perform an integration process between multiple applications by interfacing with a separate API for each application. For example, a user in an embodiment may wish to transfer information from an enterprise resource planning (ERP) platform (e.g., Oracle Netsuite) operating to manage daily business activities, such as accounting, procurement, and supply chain operations to a customer resource planning (CRM) platform (e.g., SalesForce™ CRM) operating to manage customer relations, such as sales histories and trends, customer services, and analytics assisting to determine which customers are most likely to purchase which products in which industries.

The information stored and managed by the CRM platform in an embodiment may be similar to, or partially or wholly identical to some information stored within the ERP platform. For example, an ERP platform may track prior sales to a customer for the accounting and payment purposes, while the CRM platform tracks the same prior sales to the same customer for marketing purposes. The information storage structure of the ERP platform may be different than that of the CRM platform, thus requiring a data integration process between the two applications to take into account such separate structures. In such an example embodiment, the user may perform such an integration by accessing an API for the ERP platform to retrieve information managed by the ERP and separately accessing an API for the CRM platform to transmit the information retrieved from the ERP platform to the CRM platform for storage and management.

The integration assistance robotic automation system operating at a user device in an embodiment may monitor, log, and timestamp code instructions generated by such multiple APIs pursuant to received user instructions, in order to streamline and automate future executions of similar business process data exchanges. For example, in an embodiment described with reference to FIG. 4A, the integration assistance robotic automation system may record code instructions generated by an ERP API, including login information for a specific user, allowing the user to access information stored and managed by the ERP, relating to customer accounts, such as previous sales to a given customer. As another example, in an embodiment described with reference to FIG. 4B, the integration assistance robotic automation system may record code instructions generated by a CRM API including login information for the same user, allowing the user to access information stored and managed by the CRM, relating to previous purchases made by a given customer. In an embodiment, the integration assistance robotic automation system may record these separate login events, which may also identify the ERP and CRM platforms as locations between which information may be integrated. In other embodiments, a plurality of APIs may generate code instructions pursuant to user instructions via APIs for other types applications, either currently known or future-developed, or based on user requests received via APIs for more than two applications.

As described herein, different coding languages may use different ways of describing routines, data structures, object classes, variables, or remote calls that may be invoked and/or handled during business integration processes that involves datasets managed by the backend applications such APIs serve. Because these backend applications may use differing code languages to describe accessing and integration of such datasets, the backend applications, and their respective APIs may be incapable of direct communication with one another. For example, the ERP platform may be associated with an open-standard written in a JSON format, and the CRM platform may be associated with an open-standard written in XML format. These are intended as examples, and other embodiments may include any currently known or future-developed file formats. The integration assistance robotic automation system in an embodiment may be capable of intercepting user instructions to log into or otherwise access information via an API, regardless of the file format in which such code instructions are transmitted.

At block 706, the integration assistance robotic automation system in an embodiment may log an event identifying an integration variable for the first of the two applications accessed by the user via APIs. API code instructions for achieving a task can be written in any number of languages and/or adhere to any number of proprietary standards, often requiring a code writer to have extensive knowledge of computer science and languages. As described herein, accessing each backend application through a separate API requires considerable participation on the part of the user each time the user wishes to integrate such datasets between or among the backend applications. Thus, a method capable of integrating datasets in a single integration process between or among backend applications, or their respective APIs, that are otherwise incapable of or limited with respect to direct communication with one another that does not require such repeated user interaction will improve interoperability of business process integration development. Because code instructions adhering to open-standard formats are more easily understood by non-specialists, many companies have moved to the use of code instructions adhering to these formats in constructing their data repository structures and controlling the ways in which data in these repositories may be accessed by both internal and external agents. Developers of proprietary APIs that do not use such open-standard formats may publish or make publicly available definitions for such proprietary APIs. Published API definitions may similarly describe formats and schema used in constructing proprietary API data repository structures and ways in which those repositories may be accessed. Code instructions received at an API and stored to a human-readable, machine-executable file format in an embodiment may adhere to open-standard formatting, or to formatting defined by a publicly available API definition that allows the integration assistance robotic automation system to identify and record specific code instructions necessary to perform a user-specified integration process. For example, code instructions received at an API may define an action to be taken on an object at a specific location. Such code instructions may take the form of a key-value pair (e.g., field:value) in which the key or field identifies an action, location, or object type, and the value identifies a specific action from a plurality of available actions, a specific location from a plurality of available locations, or a specific object from a plurality of available objects of that type.

In order to retrieve or transmit information between two applications in an embodiment, certain integration variables may be required to define the information to be integrated. For example, integration variables such as an action to perform, an identification of a type of information on which the action is to be performed, and a location of such information may be required in order to successfully integrate information from one location to another. One of the integration variables required to retrieve information from a starting point of an integration process may be identified at block 706 in an embodiment.

A user may choose values for these variables via the API for the first application from which the user wishes to integrate information in an embodiment. For example, in an embodiment described with reference to FIG. 4A, the user may use a drop down menu 402 to identify a customer "John Smith" 404 from a list of available customers. Such a user selection may partially identify a location within the ERP platform storage structure of the information to be integrated from the ERP API to the CRM API in an embodiment. As described herein, the ERP API in such an embodiment may translate the user selection received into code instructions understood by the ERP platform. In an example embodiment in which the ERP platform communicates according to the XML format, the ERP API in an embodiment may receive the selection of the customer "John Smith" and translate that selection into XML reading:

<SourceUrl>http://www.ERPPlatform.com/John_Smith/

As another example, in an embodiment described with reference to FIG. 5A, in order to retrieve customer information stored and managed by the ERP, a user may choose to "get" a particular type of customer information relating to the customer "John Smith" 504 by choosing the action "get" 506 from the drop down menu 502 in the ERP API in an embodiment. Such a user selection may define an action to be taken on information stored at the identified location within the ERP platform in order to integrate that information from the ERP API to the CRM API in an embodiment. In an example embodiment in which the ERP platform communicates according to the XML format, the ERP API in an embodiment may receive the selection of the action "get" and translate that selection into XML reading:

<action>get </action>

As yet another example, in an embodiment described with reference to FIG. 6A, the user may choose to get a shipping address for the customer "John Smith" 604 using the ERP API by choosing "Shipping Address" 612 from the drop down menu 602 in an embodiment. Such a user selection may define the specific data file or information (e.g., shipping address 612), stored at the identified location (e.g., "John Smith" 604) within the ERP platform, upon which an action (e.g., get 606) may be taken in order to integrate that information from the ERP API to the CRM API in an embodiment. In an example embodiment in which the ERP platform communicates according to the XML format, the ERP API in an embodiment may receive the selection of the file "Shipping Address" and translate that selection into XML reading:

<SourceUrl>http://www.ERPPlatform.com/John_Smith/Shipping_Address.doc

The integration assistance robotic automation system in an embodiment may log or record a code instruction identifying an integration variable value for the second of two applications at block 708. Once integration variable values for a starting point (e.g., the first application) have been identified, the integration variables required to transmit information to an ending point (e.g., the second application) of an integration process may be identified at block 708 in an embodiment. A user may choose values for these variables via the API for the second application to which the user wishes to integrate information in an embodiment. For example, in an embodiment described with reference to FIG. 4B, the user may use a drop down menu 406 within the CRM API to identify the account "John Smith" 408 from a list of available customers. Such an identification may partially identify a location within the CRM platform storage structure where the information to be integrated from the ERP API should be stored in an embodiment. As described herein, the CRM API in such an embodiment may translate the user selection received into code instructions understood by the CRM platform. In an example embodiment in which the CRM platform communicates according to the JSON format, the CRM API in an embodiment may receive the selection of the account "John Smith" and translate that selection into JSON reading:

paths:
/John_Smith/

As another example, in an embodiment described with reference to FIG. 5B, in order to store customer information for management by the CRM, a user may choose to "post" a particular type of customer information relating to the account "John Smith" 508 by choosing the action "post" 510 from the drop down menu 506 in the CRM API in an embodiment. Such a user selection may define an action to be taken on information stored at the identified location within the CRM platform in order to integrate that information to the CRM API in an embodiment. In an example embodiment in which the CRM platform communicates according to the JSON format, the CRM API in an embodiment may receive the selection of the action "post" and translate that selection into JSON reading:

paths:
/John_Smith/
post:

As yet another example, in an embodiment described with reference to FIG. 6B, a user wishing to post 610 a contact address for the account "John Smith" 608 using the CRM API may identify that information as "Contact Address" 616 within the CRM API by choosing "Contact Address" 616 from the drop down menu 614 in an embodiment. Such a user selection may define the specific data file or information (e.g., contact address 616), to transmit (e.g., POST 610), to the identified storage location (e.g., "John Smith" 608) within the CRM platform in an embodiment. In an example embodiment in which the CRM platform communicates according to the JSON format, the CRM API in an embodiment may receive the selection of the file "Contact Address" and translate that selection into JSON reading:

paths:
/John_Smith/{Contact_Address}:
post:
summary: Posts a contact address by account name.
parameters:
in: path
name: Contact_Address
type: integer
required: true
description: Contact_Address of the account to post to.

At block 710, the integration assistance robotic automation system in an embodiment may determine whether all integration variables necessary to complete the integration between the two applications have been selected by the user. As described herein, in order to retrieve or transmit information between two applications in an embodiment, certain integration variables, such as an action to perform, an identification of a type of information on which the action is to performed, and a location of such information may be required in order to successfully integrate information from one location to another. A successful integration may require each of these variables to be known in an embodiment. If one or more of these variable values are missing, the method may proceed back to block 706 for identification of these one or more missing variable values. For example, in an embodiment in which only the information storage locations at the ERP and CRM platforms, respectively, were identified at blocks 706 and 708, the method may proceed back to block 706 for identification of the action to be taken on information stored at the defined storage location of the ERP. As another example, in an embodiment in which the storage location and actions to be taken on the information have been identified at blocks 706 and 708, the method may proceed back to block 706 for identification of the specific data file, stored at the identified location in the ERP, upon which such an action shall be taken in order to transfer the data file to the identified location within the CRM platform. The method may loop between blocks 706-710 in such a way until the integration assistance robotic automation system determines variable values have been identified in the code instructions received at the various application APIs that are sufficient to successfully perform an integration of the identified data file from the first application (e.g., ERP platform) to the second application (e.g., CRM platform).

At block 712, the integration assistance robotic automation system in an embodiment may save or store the logs recording the code instructions received by the APIs for the two applications between which the integration process has taken place. In some embodiments, the integration assistance robotic automation system may store the logs on the same computing device at which the user interacted with the multiple APIs. For example, in an embodiment described with reference to FIG. 2, the integration assistance robotic automation system operating at least in part at the user device 202 may store the logs on the same computing device 202 at which the user interacted with the ERP and CRM platform APIs. In other embodiments, the integration assistance robotic automation system may transmit the logs to other locations within the user's enterprise network, or to a remotely located service provider system. For example, the integration assistance robotic automation system operating at least partially at the user's device 202 may transmit the logs to a portion of the integration assistance robotic automation system operating at another location (e.g., business process system 204) within the enterprise system 214 for storage. As another example, the integration assistance robotic automation system operating at least partially at the user's device 202 may transmit the logs to a portion of the integration assistance robotic automation system operating at the service provider system 212, via the network 120 for storage.

Once such a log has been stored, or transmitted to a remotely located service provider in an embodiment, the integration assistance robotic automation system operating at the user's device or at the remotely located service provider may parse the log or logs to determine values for the required integration variables, then generate a single executable integration process for future, automatic integrations of the same information previously integrated by the user via the two application APIs. In such a way, the integration assistance robotic automation system may automate integration processes without requiring user interaction with the two or more application APIs. The method may then end.

Figure 8:
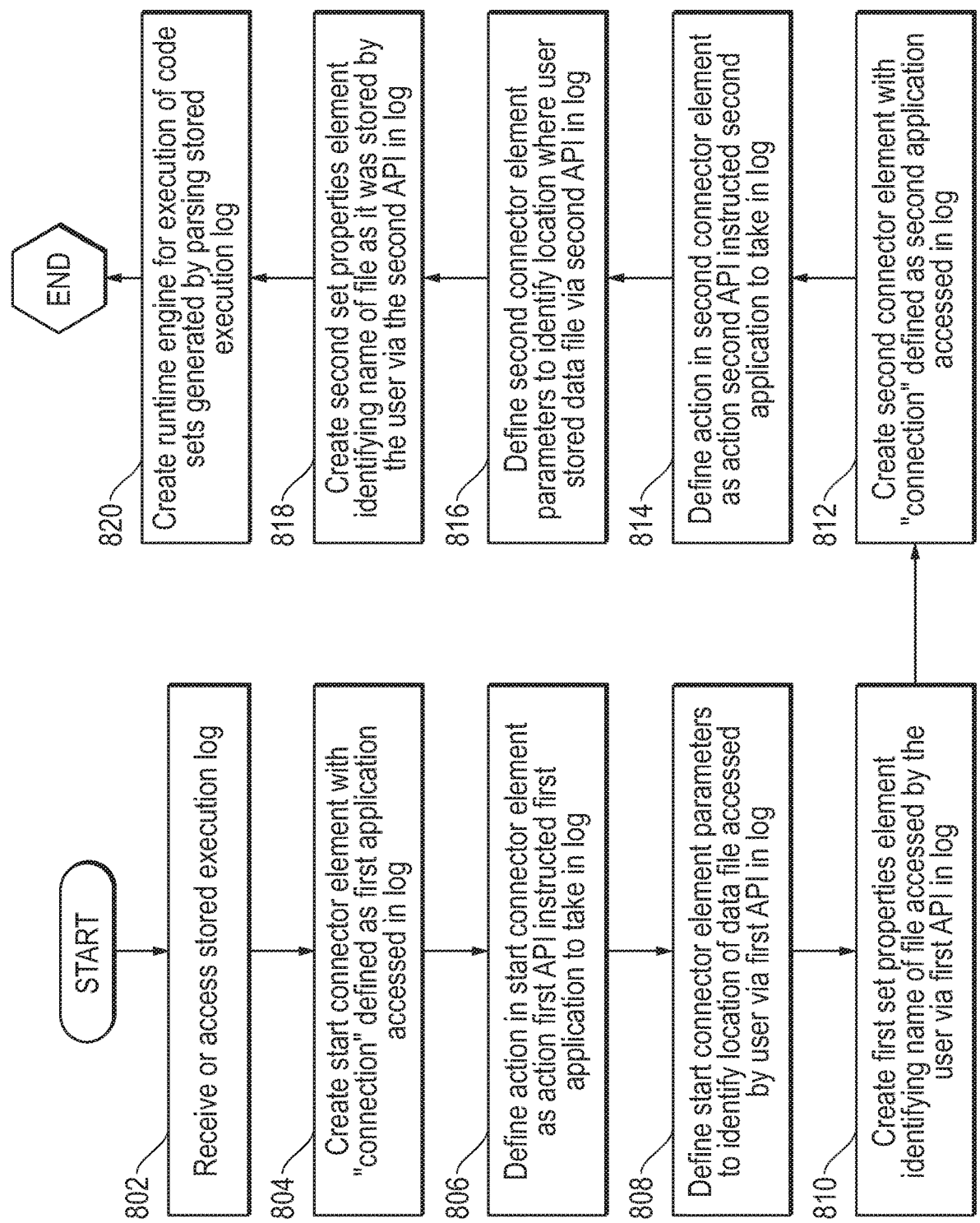
FIG. 8 is a flow diagram illustrating a method of creating an executable program for automatically integrating information between two applications according to an embodiment of the present disclosure.

FIG. 8 is a flow diagram illustrating a method of creating an executable program for automatically integrating information between two applications based on user instructions previously received at APIs for the two applications according to an embodiment of the present disclosure. As described herein, after recording code instructions generated by multiple APIs operating within the enterprise system, the integration assistance robotic automation system in embodiments of the present disclosure may provide an automated, single execution process for integrating user-specified data between user-specified and otherwise incompatible applications without customization, based on these previously recorded code instructions generated by each of the incompatible applications' APIs.

At block 802, the integration assistance robotic automation system in an embodiment may receive or access a stored execution log recording code instructions previously generated by two or more application APIs, based on received user instructions. As described herein, the integration assistance robotic automation system in an embodiment may record code instructions generated by multiple APIs operating within the enterprise system, and store those recorded commands in an execution log at the user's device, within the user's enterprise network, or at a service provider. The integration assistance robotic automation system in an embodiment may operate partially or wholly at one or each of these locations to access such a log. For example, in an embodiment described with reference to FIG. 2, the integration assistance robotic automation system operating at the user's device 202 (e.g., location at which the user interacted with the APIs described with reference to FIGS. 4A-6B) may access a log recorded and stored at the user's device 202. As another example, the integration assistance robotic automation system operating within the enterprise system network 214 may access a log recorded at the user's device 202 and transmitted to another location (e.g., business process system 204) within the enterprise system 214 for storage. As yet another example, the integration assistance robotic automation system operating at the service provider system 212 may access a log recorded at the user's device 202 and transmitted to the service provider system 212 via the network 120 for storage.

The integration assistance robotic automation system in an embodiment may create a start connector element with a "connection" defined as the first application accessed in the log at block 804. As described herein, although backend applications and their respective APIs may communicate using different code languages, each of the code languages used may incorporate similar concepts, such as an action to be performed on a dataset that is stored at a defined location. The integration assistance robotic automation system in an embodiment may build a separate connector code set for communication with each of the backend applications involved in an integration process, defining an action to be taken on a dataset, and the stored location or intended future location of that dataset at the given application.

A start element may operate to begin a process flow, and may provide data attributes unique to the user's specific integration process. For example, in an embodiment described with reference to FIG. 3, the integration assistance robotic automation system may create a start connector element 302 defining the source of incoming data to be integrated. In an embodiment in which the stored log identifies the first API accessed by the user as the ERP API, the integration assistance robotic automation system may define the ERP platform as the source of incoming data to be integrated by identifying the ERP platform within the "connection" field of the start connector element 302. More specifically, in an example embodiment, the stored log may have recorded an XML instruction defining the connection point of the ERP platform reading:

<SourceUrl>http://www.ERPPlatform.com/

In such an embodiment, the integration assistance robotic automation system may enter this Source URL within the "connection" field of the start connector element 302. In other embodiments, in which the integration assistance robotic automation system generates connector code sets without a visual flowchart, the integration assistance robotic automation system may identify the XML code instructions given directly above as the first instruction of a first connector code set.

At block 806, the integration assistance robotic automation system in an embodiment may define the action within the start connector element as the action the first API instructed the first application to take within the log. As described herein, the user or the integration assistance robotic automation system in an embodiment may use a connector element to define a connection (e.g., an application managing data upon which action is to be taken), and the action to be taken. For example, the stored log in an embodiment may have recorded an XML code instruction for performing the user-selected "get" action as:

<action>get </action>

In such an embodiment, the integration assistance robotic automation system may enter this XML code instruction into the "action" field within the start connector element 302. In other embodiments, in which the integration assistance robotic automation system generates connector code sets without a visual flowchart, the integration assistance robotic automation system may identify the XML code instructions given directly above as the second instruction of a first connector code set.

As described herein, the values assigned to such property and parameter fields of the connector elements and set properties elements in an embodiment may be written in any programming code language, so long as the code language used within a given, single element is internally consistent. Thus, the process-representing elements in an embodiment may be programming language-agnostic. By parsing the log for code instructions defining locations, actions, and specific datasets or files (regardless of the coding language used), then building connector code instructions using these parsed portions of code instructions to define the location, action, or specific dataset or file, the integration assistance robotic automation system in an embodiment may establish a means of communication with any API, in any known programming language automatically. Using such process-representing elements in an embodiment, the integration assistance robotic automation system may model an end-to-end integration process between two applications, otherwise incapable of direct communication with one another.

The integration assistance robotic automation system in an embodiment may define the start connector element parameters to identify the location of a data file or data set accessed by the user via the first API within the log at block 808. As described herein, the user or the integration assistance robotic automation system may use a connector element to further define a location of data to be integrated or migrated, according to the language and storage structure understood by the application managing such data. For example, in an embodiment described with reference to FIG. 3, the integration assistance robotic automation system may do so in an embodiment by specifying such a location within a "parameters" sub-menu of the start connector element 302. More specifically, in an example embodiment, the stored log may have recorded an XML instruction defining the location of data to be integrated reading:

<SourceUrl>http://www.ERPPlatform.com/John_Smith/ transmitted from the ERP API to the ERP platform. In such an embodiment, the integration assistance robotic automation system may recognize "John_Smith" as a customer name, and may create a parameter within a sub-menu of the start connector element 302 to define it as such. For example, the integration assistance robotic automation system may create a parameter name of "customer," and associate that parameter name with a parameter value of "John_Smith" within the sub-menu of the start connector element 302. In other embodiments, in which the integration assistance robotic automation system generates connector code sets without a visual flowchart, the integration assistance robotic automation system may identify the XML code instructions given directly above as an addition to the first instruction of a first connector code set.

At block 810, the integration assistance robotic automation system in an embodiment may create a first set properties element identifying the name of a file or dataset accessed by the user via the first API within the log. As described herein, a set properties element in an embodiment may allow the user or the integration assistance robotic automation system to set values identifying specific files using a user-defined property with a user-defined parameter, similar to a key-value pair definition. For example, the stored log in an embodiment may have recorded an XML code instruction:

<SourceUrl>http://www.ERPPlatform.com/John_Smith/
    Shipping_Address.doc transmitted from the ERP API to the ERP platform to identify the specific file "Shipping Address.doc." In such an example embodiment, the integration assistance robotic automation system may identify the portion of the code instruction "/Shipping_Address.doc" as a file name. The integration assistance robotic automation system in such an embodiment may create a set properties element defining a property of "file name," and associate that property with a parameter of "/Shipping_Address.doc." In other embodiments, in which the integration assistance robotic automation system generates connector code sets without a visual flowchart, the integration assistance robotic automation system may identify the XML code instructions given directly above as an addition to the first instruction of a first connector code set.

The integration assistance robotic automation system in an embodiment may create a second connector element with a "connection" defined as the second application accessed in the log at block 812. As described herein, the integration assistance robotic automation system in embodiments may combine parsed portions of previously recorded code instructions into a single connector code set for each application accessed in the previously executed integration process. Each of such connector code sets may provide code instructions for performing the user-specified action on a dataset managed by one of the multiple, otherwise incompatible applications involved in the previously executed integration process, written in the code language understood by that application. Multiple of these connector code sets may be combined into a single integration process that describes the movement of a dataset directly between these otherwise incompatible applications, without any intermediate handling by a user or a user device.

Such a second connector element, described with reference to block 812 may operate to define a location to which information may be transmitted during a process flow. For example, in an embodiment described with reference to FIG. 3, the integration assistance robotic automation system may create a second connector element 306 defining the endpoint for outgoing data to be integrated. In an embodiment in which the stored log identifies the second API accessed by the user as the CRM API, the integration assistance robotic automation system may define the CRM platform as the endpoint for outgoing data to be integrated by identifying the CRM platform within the "connection" field of the second connector element 306. In other embodiments, in which the integration assistance robotic automation system generates connector code sets without a visual flowchart, the integration assistance robotic automation system may identify the CRM within the first instruction of a second connector code set.

At block 814, the integration assistance robotic automation system in an embodiment may define the action within the second connector element as the action the second API instructed the second application to take within the log. For example, the stored log in an embodiment may have recorded a user instruction to perform the "post" action using the JSON code instructions:
   post:
In such an embodiment, the integration assistance robotic automation system may enter this JSON code instruction into the "action" field within the second connector element 306. As described herein, the values assigned to such property and parameter fields of the connector elements and set properties elements in an embodiment may be written in any programming code language, so long as the code language used within a given, single elements is internally consistent. By entering only information that conforms to the JSON code language within the second connector element 306, the integration assistance robotic automation system in an embodiment may ensure successful communication with the CRM platform, regardless of the code language used to communicate with the ERP platform, as modeled by the separate, start connector element 302 earlier in the integration process. Thus, the process-representing elements in an embodiment may be programming language-agnostic. In other embodiments, in which the integration assistance robotic automation system generates connector code sets without a visual flowchart, the integration assistance robotic automation system may identify the JSON code instructions given directly above as the second instruction of a second connector code set.

The integration assistance robotic automation system in an embodiment may define the second connector element parameters to identify the location of a data file or data set stored at the second application, by the user, via the second API, within the log at block 816. For example, in an embodiment described with reference to FIG. 3, the integration assistance robotic automation system may use a connector element to further define a location of data to be integrated or migrated, according to the language and storage structure understood by the application managing such data in an embodiment by specifying such a location within a "parameters" sub-menu of the second connector element 306. More specifically, in an example embodiment, the stored log may have recorded a JSON instruction defining the location of data to be integrated reading:
   paths:
      /John_Smith/
transmitted from the CRM API to the CRM platform. In such an embodiment, the integration assistance robotic automation system may recognize "John_Smith" as an account name, and may create a parameter within a sub-menu of the start connector element 306 to define it as such. For example, the integration assistance robotic automation system may create a parameter name of "account," and associate that parameter name with a parameter value of "John_Smith" within the sub-menu of the second connector element 306. In other embodiments, in which the integration assistance robotic automation system generates connector code sets without a visual flowchart, the integration assistance robotic automation system may identify the JSON code instructions given directly above as the third instruction of a second connector code set.

At block 818, the integration assistance robotic automation system in an embodiment may create a second set properties element identifying the name of a file or dataset stored by the user, at the second application, via the second API, within the log. For example, the stored log in an embodiment may have recorded a JSON code instruction:
   parameters:
      in: path
      name: Contact_Address
      type: integer
      required: true
transmitted from the CRM API to the CRM platform to identify the specific file "Contact Address." In such an example embodiment, the integration assistance robotic automation system may identify the portion of the code instruction "Contact_Address" as a file name. The integration assistance robotic automation system in such an embodiment may create a set properties element defining a property of "file name," and associate that property with a parameter of "Contact_Address." In other embodiments, in which the integration assistance robotic automation system generates connector code sets without a visual flowchart, the integration assistance robotic automation system may identify the JSON code instructions given directly above as the fourth instruction of a second connector code set. In such a way, the integration assistance robotic automation system in an embodiment may model communication with a first API in a first programming language and communication with a second API in a second programming language within a single integration process, using only code instructions recorded between each of these APIs and their respective applications or platforms.

The integration assistance robotic automation system in an embodiment may create a runtime engine for execution of code sets associated with the connector and set properties elements at block 820. As described herein, upon the user modeling the integration process, the service provide system/server in an embodiment may generate a run-time engine capable of executing the pre-defined subsets of code instructions (e.g., connector code sets) represented by the connector integration elements chosen by the user or indicated by the integration assistance robotic automation system. The runtime engine may then execute the connector code sets in the order defined by the modeled flow of the connector integration elements given in the integration process flow diagram, or dictated by the integration assistance robotic automation system. The integration assistance robotic automation system in an embodiment may create and transmit a runtime engine, along with each of these multiple connector code sets to a user device (e.g., within a firewalled enterprise network) for execution of the connector code sets at that user device. Because such a runtime engine retrieves and executes pre-stored portions of code instructions taken from logged interactions between an API and its backend application, without having to generate or create any of these code instructions, the runtime engine may execute code instructions in any or multiple code languages within a single execution of the integration process. In such a way, a single integration process may be executed to move a user-specified dataset between or among multiple applications otherwise incapable of communication with one another. Further, such a single execution may negate a need for user interaction with multiple APIs each time a user wishes to integrate a dataset between incompatible applications.

The blocks of the flow diagrams 7-8 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating an integration assistance robotic automation system comprising:
   a memory storing a log of machine-executable code instructions generated by a plurality of application programming interfaces (APIs) for a first application and a second application, based on user instructions previously received at the plurality of APIs to define a user-designed integration process between the first application and the second application;
   wherein the first application executes code instructions in a first coding language and the second application executes code instructions in a second coding language;
   a processor parsing the log to identify a first connector code set written in the first coding language to define an action to be taken on a dataset managed at a specific location by the first application, and a second connector code set written in the second coding language to define an action to be taken on a dataset managed at a specific location by the second application;
   the processor transmitting an executable run-time engine, the first connector code set, and the second connector code set for execution at an execution location.

2. The information handling system of claim 1 further comprising:
   the processor intercepting a first API code instruction transmitted from a first API to the first application, defining the action to be taken on the dataset managed by the first application, and a second API code instruction transmitted from a second API to the second application, defining the action to be taken on the dataset managed at the specific location by the second application; and
   the memory storing the intercepted first API code instruction and the intercepted second API code instruction as the log of machine-executable code instructions.

3. The information handling system of claim 2, wherein the processor executes a robotic process automation logging code instruction to intercept the first API code instruction and the second API code instruction.

4. The information handling system of claim 1, wherein the first coding language is XML.

5. The information handling system of claim 1, wherein the second coding language is JSON.

6. The information handling system of claim 1, wherein one of the plurality of applications is executed at a different location than a location at which the runtime engine is executed.

7. The information handling system of claim 1, wherein the first application is executed at a same location as a location at which the runtime engine is executed.

8. A method of automatically creating an executable process of integrating a dataset between two incompatible applications comprising:
   storing, in a memory, a log of machine-executable code instructions generated by a plurality of application programming interfaces (APIs) for a first application and a second application, based on user instructions previously received at the plurality of APIs to define a user-designed integration process between the first application and the second application;
   wherein the first application executes code instructions in a first coding language and the second application executes code instructions in a second coding language;
   parsing the log, via a processor, to identify a first connector code set written in the first coding language to define an action to be taken on a dataset managed at a specific location by the first application, and a second connector code set written in the second coding language to define an action to be taken on a dataset managed at a specific location by the second application;
   transmitting, via the processor, an executable run-time engine, the first connector code set, and the second connector code set for execution at an execution location.

9. The method of claim 8 further comprising:
   intercepting, via a processor, a first API code instruction transmitted from a first API to the first application, defining the action to be taken on the dataset managed by the first application, and a second API code instruction transmitted from a second API to the second application, defining the action to be taken on the dataset managed at the specific location by the second application; and storing the intercepted first API code instruction and the intercepted second API code instruction in the memory as the log of machine-executable code instructions.

10. The method of claim 9, wherein the processor executes a robotic process automation logging code instruction to intercept the first API code instruction and the second API code instruction.

11. The method of claim 8, wherein the first coding language is XML.

12. The method of claim 8, wherein the second coding language is JSON.

13. The method of claim 8, wherein the second application is executed at a different location than a location at which the runtime engine is executed.

14. The method of claim 8, wherein the second application is executed at a same location as a location at which the runtime engine is executed.

15. An information handling system operating an integration assistance robotic automation system comprising:
   the processor intercepting a first API code instruction written in a first coding language, transmitted from a first of a plurality of APIs to a first application, defining an action to be taken on a dataset managed at a specific location by the first application in an integration process for a plurality of applications, based on user instructions received at the first of the plurality of APIs;
   a processor intercepting a second API code instruction, written in a second coding language, transmitted from a second of the plurality of APIs to a second application in the integration process, defining an action to be taken on a dataset managed at a specific location by the second application, based on user instructions received at the second of the plurality of APIs;
   a memory for storing the intercepted first API code instruction and the intercepted second API code instruction as a log of machine-executable code instructions;
   the processor parsing the log to identify a first connector code set written in the first coding language, defining the action to be taken on the dataset managed at the specific location by the first application, and a second connector code set written in the second coding language, defining the action to be taken on the dataset managed at the specific location by the second application;
   the processor transmitting an executable run-time engine, the first connector code set, and the second connector code set for execution at an execution location.

16. The information handling system of claim 15, wherein the processor executes a robotic process automation logging code instruction to intercept the first API code instruction and the second API code instruction.

17. The information handling system of claim 1, wherein the first coding language is JSON.

18. The information handling system of claim 1, wherein the second coding language is XML.

19. The information handling system of claim 1, wherein the first application is executed at a cloud service provider, in a different location than the location at which the runtime engine is executed.

20. The information handling system of claim 1, wherein the second application is executed at a cloud service provider, at a same location as the location at which the runtime engine is executed.

* * * * *